United States Patent
Kawakami

(10) Patent No.: US 11,708,460 B2
(45) Date of Patent: Jul. 25, 2023

(54) ALKOXYSILYL GROUP-CONTAINING ORGANIC SILAZANE COMPOUND, METHOD FOR PRODUCING SAME, COMPOSITION CONTAINING SAME AND CURED PRODUCT

(71) Applicant: Shin-Etsu Chemical Co., Ltd., Tokyo (JP)

(72) Inventor: Masato Kawakami, Joetsu (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 62 days.

(21) Appl. No.: 16/850,538

(22) Filed: Apr. 16, 2020

(65) Prior Publication Data
US 2020/0332071 A1 Oct. 22, 2020

(30) Foreign Application Priority Data

Apr. 17, 2019 (JP) ................. 2019-078682

(51) Int. Cl.
| | | |
|---|---|---|
| C08G 77/62 | (2006.01) | |
| C07F 7/10 | (2006.01) | |
| C08G 77/08 | (2006.01) | |
| C08G 77/28 | (2006.01) | |

(52) U.S. Cl.
CPC .............. *C08G 77/62* (2013.01); *C07F 7/10* (2013.01); *C08G 77/08* (2013.01); *C08G 77/28* (2013.01)

(58) Field of Classification Search
CPC ........... C07F 7/10; C08G 77/54; C08G 77/62; C08G 77/28
USPC ........................... 528/15; 556/409
See application file for complete search history.

(56) References Cited

U.S. PATENT DOCUMENTS

| | | | | |
|---|---|---|---|---|
| 4,898,453 A * | 2/1990 | Hohenecker | ............. | G03B 3/00 359/830 |
| 5,017,672 A * | 5/1991 | Krahnke | ............... | C07F 7/1804 528/33 |
| 6,326,506 B1 * | 12/2001 | Tachikawa | ............... | C07F 7/14 556/479 |
| 10,961,354 B1 * | 3/2021 | Eckel | .................. | B28B 1/001 |
| 2003/0083453 A1 * | 5/2003 | Lukacs, III | ............ | C08G 77/54 528/10 |
| 2004/0158018 A1 * | 8/2004 | Kobayahi | ............ | C08G 77/18 528/10 |
| 2006/0135687 A1 * | 6/2006 | Fukui | ..................... | C08L 83/04 524/588 |
| 2007/0243394 A1 * | 10/2007 | Yamaya | ................ | C09D 183/14 524/588 |
| 2008/0107894 A1 * | 5/2008 | Brand | .................. | C09D 183/16 528/21 |
| 2011/0156221 A1 * | 6/2011 | Rode | ................. | H01L 21/02318 257/632 |
| 2015/0188006 A1 * | 7/2015 | Williams | ................ | H01L 33/56 438/26 |
| 2016/0185980 A1 | 6/2016 | Margaillan et al. | | |
| 2016/0362580 A1 | 12/2016 | Grottenmuller et al. | | |
| 2021/0095079 A1 * | 4/2021 | Kawakami | ........... | C08K 5/5406 |

FOREIGN PATENT DOCUMENTS

| | | |
|---|---|---|
| CN | 110903484 A | 3/2020 |
| EP | 3 546 498 A1 | 10/2019 |
| JP | 2004-532318 A | 10/2004 |

OTHER PUBLICATIONS

Kuciński et al., "Pt-Catalyzed Synthesis of Functionalized Symmetrical and Unsymmetrical Disilazanes," Chemistry A European Journal Communication, vol. 22, 2016, pp. 13046-13049.

(Continued)

*Primary Examiner* — Margaret G Moore
(74) *Attorney, Agent, or Firm* — Birch, Stewart, Kolash & Birch, LLP

(57) ABSTRACT

An alkoxysilyl group-containing organic silazane compound having an average composition represented by formula (1) below:

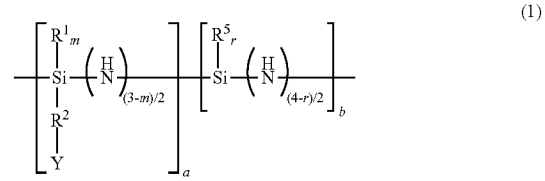

wherein $R^1$ is a monovalent hydrocarbon group, $R^2$ is a divalent hydrocarbon group, Y is a group represented by formula (6) or (7) below:

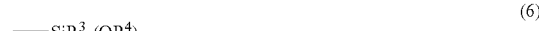

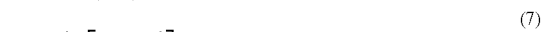

wherein $R^3$, $R^4$, and $R^6$ are a monovalent hydrocarbon group, X is an oxygen atom or a divalent hydrocarbon group, p is an integer of 0 to 9, and n is 0, 1, or 2,
$R^5$ is a monovalent hydrocarbon group, m is 0 or 1, r is 0, 1, or 2, and a and b are numbers which satisfy $0<a\leq1$, $0\leq b<1$, and $a+b=1$.

8 Claims, 12 Drawing Sheets

(56) References Cited

OTHER PUBLICATIONS

Extended European Search Report dated May 11, 2020, in European Patent Application No. 20168694.6.
Written Opinion and Search Report dated Jan. 5, 2022, in Singapore Patent Application No. 10202003368R.
Office Action dated Feb. 15, 2022, in Japanese Patent Application No. 2019-078682.

* cited by examiner

ALKOXYSILYL GROUP-CONTAINING ORGANIC SILAZANE COMPOUND, METHOD FOR PRODUCING SAME, COMPOSITION CONTAINING SAME AND CURED PRODUCT

CROSS-REFERENCE TO RELATED APPLICATION

This non-provisional application claims priority under 35 U.S.C. § 119(a) on Patent Application No. 2019-078682 filed in Japan on Apr. 17, 2019, the entire contents of which are hereby incorporated by reference.

TECHNICAL FIELD

The present invention relates to an alkoxysilyl group-containing organic silazane compound, a method for producing the same, and a composition containing the same and a cured product.

BACKGROUND ART

Silazane compounds are a group of compounds having Si—N bond (silazane bond). Silazane compounds react with moisture in the air and Si—N bond (silazane bond) is converted into Si—O—Si bond (siloxane bond) by a hydrolytic condensation. In general, Si—N bond is known to be more reactive than Si—OR bond (R is Si or an alkyl group).

Examples of typical silazane compounds include hexamethyldisilazane. This compound is represented by the formula $(CH_3)_3Si-NH-Si(CH_3)_3$ and is used for the surface treatment of glass, silicon substrates, and powders. Hexamethyldisilazane is capable of trimethylsilylating a hydroxy group (—OH). An object treated with this compound exhibits hydrophobicity derived from the trimethylsilyl group.

Examples of other silazane compounds include silazane compounds represented by average compositions such as $-[SiH_2-NH]_n-$ and $R'-Si(NH)_{3/2}$. (R' is a hydrogen atom or an organic group other than an organoxy group). These compounds, which are called polysilazane, can form a three-dimensional crosslinked structure as a hydrolytic condensation proceeds, and are capable of providing a cured coating.

The properties of the cured coating vary depending on the substituents possessed by polysilazane compounds. A cured coating obtained from a polysilazane compound which is free of organic substituents and has a main structure of $-[SiH_2-NH]_n-$, namely an inorganic polysilazane compound is glass-like and exhibits hydrophilicity. On the other hand, an organic polysilazane compound having an average composition of $R'-Si(NH)_{3/2}$ (R' has a meaning same as above) as a main structure is cured into a coating having water repellency derived from alkyl groups such as methyl groups when the organic polysilazane compound has such organic substituents.

Since Si—N bond is highly reactive, it easily reacts with moisture in the air. So, polysilazane compounds are capable of quickly forming a cured coating.

In general, silazane compounds are obtained by reacting ammonia with a chlorosilane compound having chlorine on silicon atom. The silazane compound obtained by this method has a substituent derived from the chlorosilane compound. Also known silazane compounds include those having a substituent derived from olefins, which can be obtained by reacting a silazane compound having Si—H groups with olefins in the presence of a platinum catalyst (Non-Patent Document 1).

Other examples of compounds which form a cured coating derived from a three-dimensional cross-linked structure include silicone resins and silicone oligomers. Silicone resins contain siloxane bonds and have silanol groups (Si—OH) in the molecule. Silanol groups in the molecule of the silicone resin are dehydrated and condensed upon heating to 100 to 250° C. to form a cured coating.

Silicone oligomers are silicone resins having a relatively low molecular weight and have alkoxysilyl groups (Si—OR") (R" is an alkyl group) instead of silanol groups. An alkoxysilyl group (Si—OR") containing silane compound reacts with moisture in the air in the presence of a catalyst and undergoes dealcohol condensation, thereby a cured coating is formed at room temperature.

The silicone resins and silicone oligomers are used for coating agent raw materials, surface treatment agents and the like. They can impart heat resistance, weather resistance, electrical insulation, water repellency, adhesion, water resistance and the like to the coated surface, and thus are used in a wide range of fields.

CITATION LIST

Non-Patent Document 1: Chemistry A European Journal, 2016, Volume 22 (pages 13,046 to 13,049)

DISCLOSURE OF INVENTION

Although the silazane compound described in Non-Patent Document 1 has various substituents, the silazane compound does not form a cured coating because it undergoes two-dimensional crosslinking at most even if hydrolytic condensation proceeds. The silazane compound has only two high reactive Si—N bonds in the molecule, and thus the effect of silazane may not be sufficiently exhibited.

Silicone resins can impart alcohol resistance when they are heated and cured at 100 to 250° C. However, they have a problem in workability because the silicone resins need a dedicated instrument for heat curing. In particular, heating in the outdoors is difficult. Although a cured coating can be formed at room temperature by combining silicone resins with a catalyst, the resulting cured coating has a problem of low alcohol resistance.

Considering that the silicone resins are used as coating agents or surface treatment raw materials, the coating is supposed to be cleaned with an alcohol-containing detergent or the like when it is soiled. However, the silicone resins with low alcohol resistance are peeled from the coated surface and the desired performance is lost when the resins are washed with an alcohol-containing detergent. Also, silicone oligomers are low molecular silicone resins, and thus they have the same problem as above.

An object of the invention is to provide an alkoxysilyl group-containing organic silazane compound which quickly forms, at room temperature, a cured coating having excellent alcohol resistance, a method for producing the same, a composition containing the same, and a cured product.

The inventors of the present invention have found that an alkoxysilyl group-containing organic silazane compound having a predetermined structure can be quickly cured at room temperature, and gives a cured coating having alcohol resistance.

Accordingly, the present invention provides

[1] An alkoxysilyl group-containing organic silazane compound having an average composition represented by general formula (1) below:

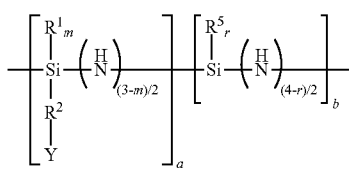

wherein $R^1$ is each independently a monovalent hydrocarbon group having 1 to 10 carbon atoms, $R^2$ is each independently a substituted or unsubstituted divalent hydrocarbon group having 2 to 20 carbon atoms optionally containing a heteroatom of O, S, or Si, Y is a group represented by formula (6) or (7) below:

$$—SiR^3{}_n(OR^4)_{3-n} \quad (6)$$

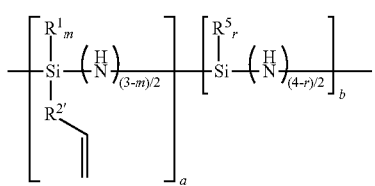

wherein $R^3$ and $R^4$ are each independently a monovalent hydrocarbon group having 1 to 10 carbon atoms, $R^6$ is each independently a substituted or unsubstituted monovalent hydrocarbon group having 1 to 10 carbon atoms, X is an oxygen atom, or a substituted or unsubstituted divalent hydrocarbon group having 1 to 18 carbon atoms, p is an integer of 0 to 9, and n is 0, 1, or 2, $R^5$ is each independently a substituted or unsubstituted monovalent hydrocarbon group having 1 to 50 carbon atoms optionally containing a heteroatom of O or S, m is each independently 0 or 1, r is each independently 0, 1, or 2, and a and b are numbers which satisfy $0<a\leq1$, $0\leq b<1$, and $a+b=1$,

[2] A method for producing the alkoxysilyl group-containing organic silazane compound according to [1], including:

reacting, in the presence of a platinum catalyst, an unsaturated bond-containing organic silazane compound represented by general formula (2) below:

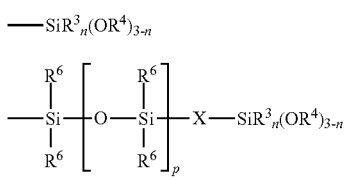

wherein $R^{2'}$ is each independently a single bond or a substituted or unsubstituted divalent hydrocarbon group having 1 to 18 carbon atoms optionally containing a heteroatom of O, S, or Si, and $R^1$, $R^5$, a, b, m, and r have the same meaning as above, with a hydrogensilane compound represented by general formula (3) or (4) below:

$$H—SiR^3{}_n(OR^4)_{3-n} \quad (3)$$

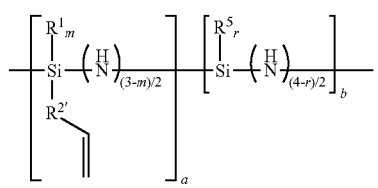

wherein $R^3$, $R^4$, $R^6$, X, n, and p have the same meaning as above,

[3] A method for producing the alkoxysilyl group-containing organic silazane compound according to [1], including:

reacting, in the presence of a radical generator, an unsaturated bond-containing organic silazane compound represented by general formula (2) below:

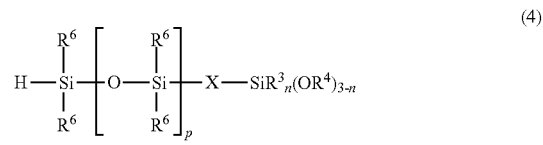

wherein $R^{2'}$ is each independently a single bond or a substituted or unsubstituted divalent hydrocarbon group having 1 to 18 carbon atoms optionally containing a heteroatom of O, S, or Si, and $R^1$, $R^5$, a, b, m, and r have a meaning same as above, with a mercapto group-containing silane compound represented by general formula (5) below:

$$HS—R^8—SiR^3{}_n(OR^4)_{3-n} \quad (5)$$

wherein $R^8$ is a divalent hydrocarbon group having 1 to 18 carbon atoms, and $R^3$, $R^4$, and n have a meaning same as above,

[4] A composition including:
the alkoxysilyl group-containing organic silazane compound according to [1]; and
at least one metal compound selected from the group consisting of a titanium compound, an aluminum compound, a zinc compound, and a tin compound,

[5] The composition according to [4], further including a solvent,

[6] A cured product of the composition according to [4] or [5].

Advantageous Effects of the Invention

The alkoxysilyl group-containing organic silazane compound obtained by the present invention reacts with moisture in the air to form a cured coating quickly, because the hydrolysis of the silazane bond site and the hydrolysis of the alkoxysilyl group site proceed simultaneously at room temperature (25° C.). In addition, the cured coating thus obtained has alcohol resistance, and thus has high durability if used as a coating agent for outdoor painting or the like.

DESCRIPTION OF THE PREFERRED EMBODIMENTS

Figure 1:
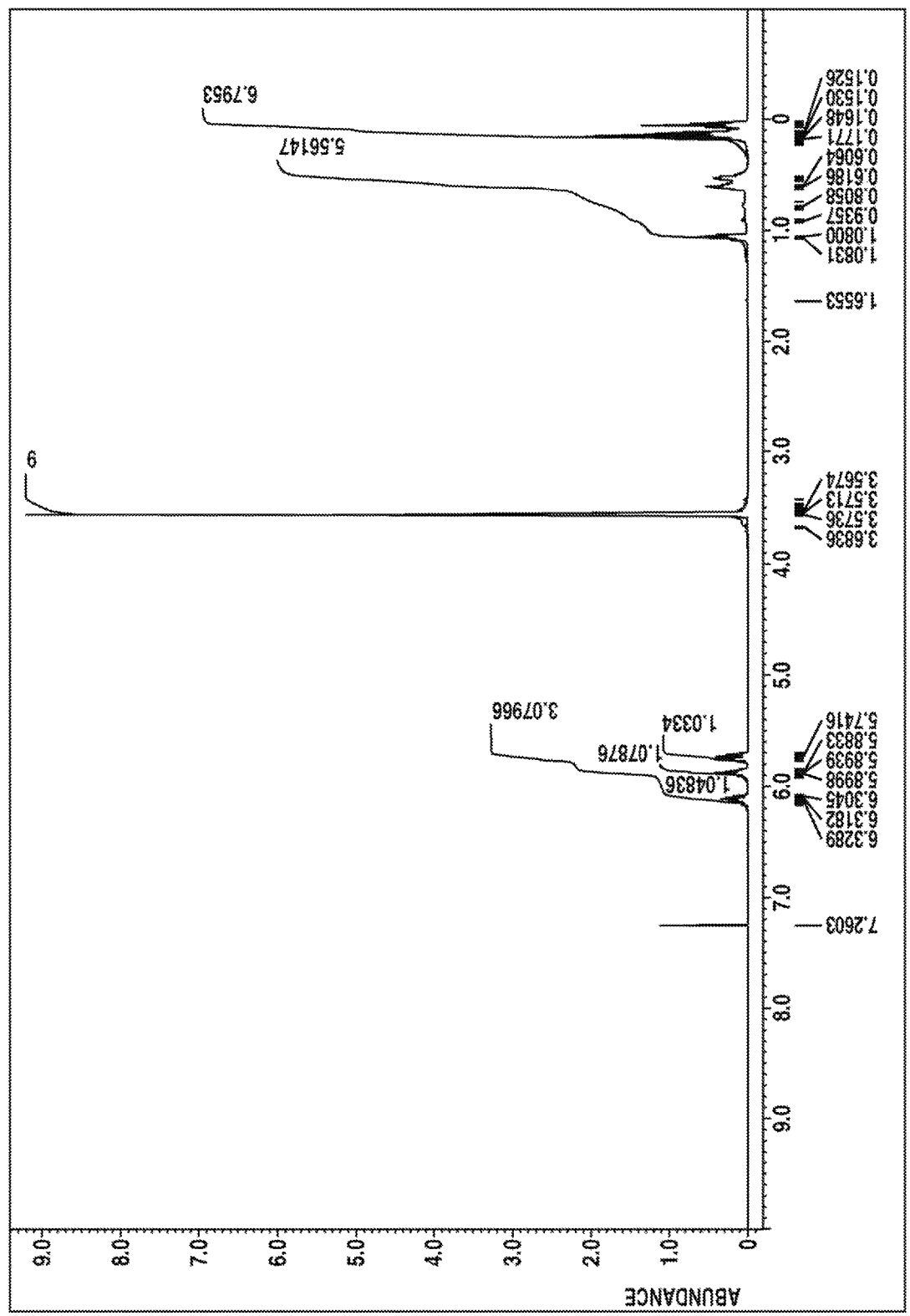
FIG. 1 is a $^1$H-NMR spectrum of the silazane compound obtained in Example 1-1.

Hereinafter, the present invention is specifically described.

[Alkoxysilyl Group-Containing Organic Silazane Compound]

The alkoxysilyl group-containing organic silazane compound has an average composition represented by general formula (1) below.

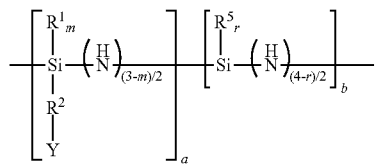

(1)

In the general formula (1), $R^1$ each independently represents a monovalent hydrocarbon group having 1 to 10 carbon atoms, preferably 1 to 5 carbon atoms. Specific examples of the monovalent hydrocarbon group of $R^1$ include linear alkyl groups such as methyl group, ethyl group, n-propyl group, n-butyl group, n-pentyl group, n-hexyl group, n-heptyl group, n-octyl group, and n-decyl group; branched alkyl groups such as isopropyl group, isobutyl group, sec-butyl group, tert-butyl group, neopentyl group, texyl group, and 2-ethylhexyl group; cyclic alkyl groups such as a cyclopentyl group and a cyclohexyl group; alkenyl groups such as vinyl group, allyl group, propenyl group, butenyl group, and pentenyl group; aryl groups such as phenyl group and tolyl group; and aralkyl groups such as benzyl group and phenethyl group.

In the general formula (1), $R^2$ is each independently a substituted or unsubstituted divalent hydrocarbon group having 2 to 20 carbon atoms, preferably 2 to 10 carbon atoms, more preferably 2 to 5 carbon atoms optionally containing a heteroatom of O, S, or Si.

Specific examples of the divalent hydrocarbon group of $R^2$ include linear alkylene groups such as ethylene group, trimethylene group, tetramethylene group, hexamethylene group, octamethylene group, and decamethylene group; branched alkylene groups such as propylene (methylethyl-ene) group and methyltrimethylene group; cyclic alkylene groups such as cyclohexylene group and methylenecyclo-hexylenemethylene group; alkenylene groups such as pro-penylene group, butenylene group, hexenylene group, and octenylene group; arylene groups such as phenylene group; and aralkylene groups such as methylenephenylene group and methylenephenylenemethylene group.

Specific examples of the divalent hydrocarbon group containing a heteroatom of O, S, or Si of $R^2$ include oxyalkylene group, alkyleneoxyalkylene group, thioal-kylene group, alkylenethioalkylene group, dialkylsilylal-kylene group, and alkylenedialkylsilylalkylene group, and examples of these alkylene groups each independently include the same substituents as the groups exemplified above for the linear, branched, and cyclic alkylene groups having 1 to 20 carbon atoms.

In the divalent hydrocarbon group of $R^2$, a part or all of the hydrogen atoms can be substituted with a halogen atom such as a fluorine atom. Specific examples of the divalent hydrocarbon group substituted with a fluorine atom include alkylene fluoroalkylene alkylene groups such as ethylene tetrafluoroethylene ethylene group, ethylene hexafluoropro-pylene ethylene group, ethylene octafluorotetramethylene ethylene group, ethylene dodecafluorohexamethylene ethyl-ene group, propylene octafluorotetramethylene propylene group, propylene dodecafluorohexamethylene propylene group, hexamethylene octafluorotetramethylene hexameth-ylene group, and hexamethylene dodecafluorohexamethyl-ene hexamethylene group.

In the general formula (1), Y is a group represented by formula (6) or (7) below.

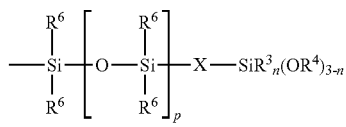

In general formula (6) or (7), $R^3$ and $R^4$ each independently represent a monovalent hydrocarbon group having 1 to 10 carbon atoms, preferably 1 to 5 carbon atoms. Specific examples of $R^3$ and $R^4$ include the same as those in $R^1$. n is 0, 1, or 2.

$R^6$ each independently represents a substituted or unsubstituted monovalent hydrocarbon group having 1 to 10 carbon atoms, preferably 1 to 5 carbon atoms, and examples thereof include the same substituents as in $R^1$, $R^3$ and $R^4$.

In the monovalent hydrocarbon group of $R^6$, a part or all of the hydrogen atoms can be substituted with a fluorine atom. Specific examples of the monovalent hydrocarbon group substituted with a fluorine atom include fluoroalkyl groups such as (3,3,3-trifluoro)propyl, (3,3,4,4,5,5,6,6,6) nonafluorobutyl, and (3,3,4,4,5,5,6,6,7,7,8,8,8)-tridecafluo-rohexyl.

X is an oxygen atom or a substituted or unsubstituted divalent hydrocarbon group having 1 to 18 carbon atoms, preferably 2 to 12 carbon atoms, more preferably 2 to 8 carbon atoms.

Specific examples of the divalent hydrocarbon group of X include linear alkylene groups such as methylene, ethylene, trimethylene, tetramethylene, hexamethylene, octamethyl-ene, and decylene; branched alkylene groups such as pro-pylene (methylethylene) and methyltrimethylene group;

cyclic alkylene groups such as cyclohexylene group and methylenecyclohexylenemethylene group; alkenylene groups such as propenylene group, butenylene group, hexenylene group, and octenylene group; arylene groups such as phenylene group; and aralkylene groups such as methylenephenylene group and methylenephenylenemethylene group.

If X above is a divalent hydrocarbon group, a part or all of the hydrogen atoms in the hydrocarbon group can be substituted with a fluorine atom, and specific examples thereof include the same substituents as those of the divalent hydrocarbon group substituted with a fluorine atom of $R^2$.

In general formula (7), p is an integer of 0 to 9, preferably 1 to 5.

In the general formula (1), $R^5$ represents each independently a substituted or unsubstituted monovalent hydrocarbon group having 1 to 50 carbon atoms, preferably 1 to 20 carbon atoms, more preferably 1 to 10 carbon atoms optionally containing a heteroatom of O or S.

Specific examples of the monovalent hydrocarbon group of $R^5$ include linear alkyl groups such as methyl group, ethyl group, n-propyl group, n-butyl group, n-pentyl group, n-hexyl group, n-heptyl group, n-octyl group, n-decyl group, n-dodecyl group, n-tetradecyl group, n-hexadecyl group, and n-octadecyl group; branched alkyl groups such as isopropyl group, isobutyl group, sec-butyl group, tert-butyl group, neopentyl group, texyl group, and 2-ethylhexyl group; cyclic alkyl groups such as a cyclopentyl group and a cyclohexyl group; alkenyl groups such as vinyl group, allyl group, propenyl group, butenyl group, and pentenyl group; aryl groups such as phenyl group and tolyl group; and aralkyl groups such as benzyl group and phenethyl group.

Specific examples of the monovalent hydrocarbon group containing a heteroatom of O or S of $R^5$ include oxyalkyl group, alkyleneoxyalkyl group, thioalkyl group, and alkylenethioalkyl group, and examples of these alkyl groups each independently include the same substituents as groups exemplified above in linear, branched, and cyclic alkyl groups having 1 to 50 carbon atoms.

Further, in the monovalent hydrocarbon group of $R^5$, a part or all of the hydrogen atoms can be substituted with other substituents. Specific examples of these substituents include halogen atoms such as fluorine atom; aryl groups having 6 to 9 carbon atoms such as phenyl group and tolyl group; aralkyl groups having 7 to 9 carbon atoms such as benzyl group and phenethyl group; and trialkylsilyl groups in which each alkyl group has 1 to 3 carbon atoms, and siloxanyl groups represented by general formula (8) below.

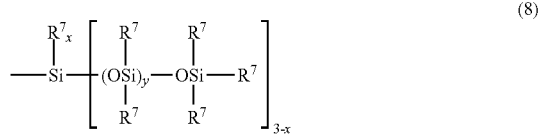

(8)

In general formula (8), $R^7$ each independently represents a substituted or unsubstituted monovalent hydrocarbon group having 1 to 10 carbon atoms, preferably 1 to 6 carbon atoms, and a part or all of the hydrogen atoms in the monovalent hydrocarbon groups can be substituted with a halogen atom such as a fluorine atom.

Examples of the monovalent hydrocarbon group of $R^7$ include linear alkyl groups such as methyl group, ethyl group, n-propyl group, n-butyl group, n-pentyl group, n-hexyl group, n-heptyl group, n-octyl group, and n-decyl group; branched alkyl groups such as isopropyl group, isobutyl group, sec-butyl group, tert-butyl group, neopentyl group, texyl group, and 2-ethylhexyl group; cyclic alkyl groups such as a cyclopentyl group and a cyclohexyl group; alkenyl groups such as vinyl group, allyl group, propenyl group, butenyl group, and pentenyl group; aryl groups such as phenyl group and tolyl group; and aralkyl groups such as benzyl group and phenethyl group.

x is 0, 1, or 2, and if x is 0 or 1, —OSi$R^7_3$ groups can be desiloxane-condensed to form a cyclic siloxane.

y represents an integer of 0 to 20, preferably 0 to 15, more preferably 0 to 8.

In the general formula (8), the combination of $R^7$, x, and y is arbitrary and there is no particular limitation.

Specific examples of the siloxanyl group represented by general formula (8) include polyalkylpolysiloxanyl groups such as 1,1,1,3,3-pentamethyldisiloxanyl group, 1,1,1,3,3,5,5-heptamethyltrisiloxanyl group, and 1,1,1,3,3,5,5,7,7-nonamethyltetrasiloxanyl group; polyalkylcyclopolysiloxanyl groups such as 1,1,3,3,5-pentamethylcyclotrisiloxanyl group, 1,1,3,3,5,5,7-heptamethylcyclotetrasiloxanyl group, and 1,1,3,3,5,5,7,7,9-nonamethylcyclopentasiloxanyl group; polyphenylpolysiloxanyl groups such as 3,5-diphenyl-1,1,1,3,5-pentamethyltrisiloxanyl group, 1,1,1,3,5,7-hexamethyl-3,5,7-triphenyltetrasiloxanyl group, 1,1,1,3,5,7,9-heptamethyl-3,5,7,9-tetraphenylpentasiloxanyl group, 3,3,5,5-tetraphenyl-1,1,1-trimethyltrisiloxanyl group, 3,3,5,5,7,7-hexaphenyl-1,1,1-trimethyltetrasiloxanyl group, and 3,3,5,5,7,7,9,9-octaphenyl-1,1,1-trimethylpentacyloxanyl group.

In general formula (1), m each independently represents 0 or 1, r is each independently 0, 1, or 2, and a and b are numbers which satisfy $0<a\leq 1$, $0\leq b<1$, and $a+b=1$.

If the alkoxysilyl group-containing organic silazane compound is a polysilazane compound, the structure thereof is not particularly limited, and can be linear, branched, or cyclic.

If the alkoxysilyl group-containing organic silazane compound is a polysilazane compound, the number average molecular weight in terms of polystyrene by gel permeation chromatography (hereinafter referred to as "GPC") is preferably 300 to 100,000, more preferably 300 to 30,000, even more preferably 300 to 10,000. GPC conditions are as described in Examples.

Examples of the alkoxysilyl group-containing organic silazane compound include the following. In formulas below, Me represents a methyl group, Et represents an ethyl group, and Hex represents an n-hexyl group.

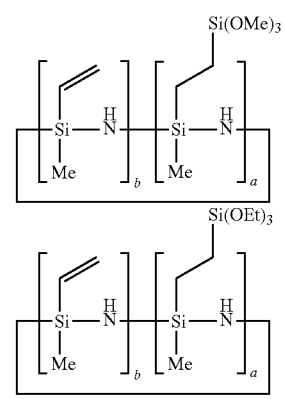

-continued

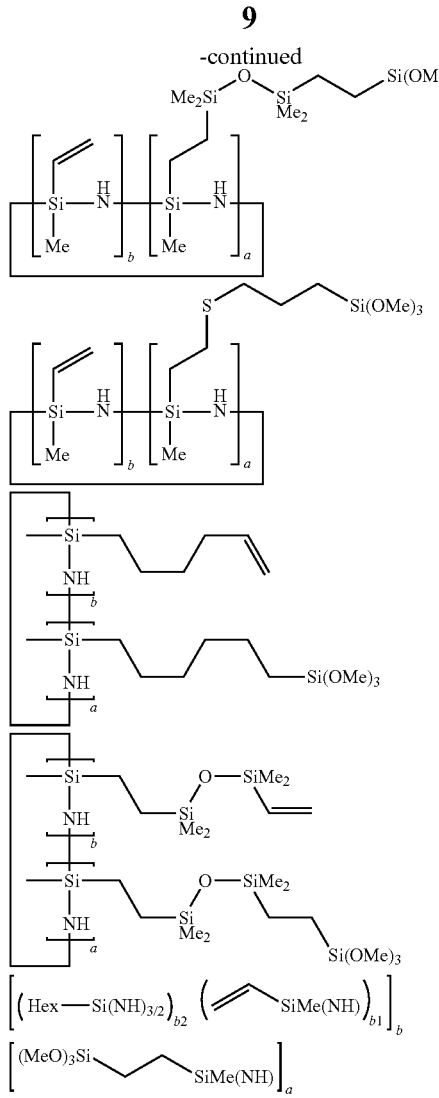

In formulas above, though a and b are as described above, they are preferably numbers which satisfy a/(a+b)=0.2 to 0.9. b1 and b2 are the numbers which satisfy b1+b2=b.

[Method for Production]

A method for producing the alkoxysilyl group-containing organic silazane compound is described.

The alkoxysilyl group-containing organic silazane compound is obtained, for example, by reacting in the presence of a platinum catalyst an unsaturated bond-containing organic silazane compound represented by general formula (2) below with a hydrogensilane compound represented by general formula (3) or (4) below.

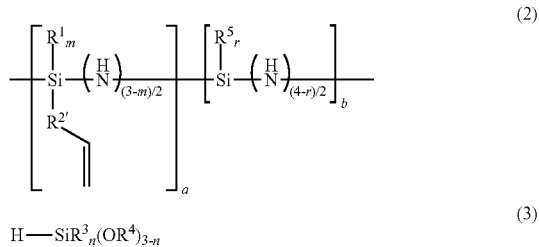

-continued $$H-\underset{R^6}{\overset{R^6}{Si}}-\left[O-\underset{R^6}{\overset{R^6}{Si}}\right]_p-X-SiR^3{}_n(OR^4)_{3-n} \quad (4)$$

In the general formula (2), $R^{2\prime}$ is each independently a single bond or a divalent hydrocarbon group having 1 to 18 carbon atoms, preferably 1 to 8 carbon atoms, more preferably 1 to 5 carbon atoms optionally containing a heteroatom of O, S, or Si.

Specific examples of the divalent hydrocarbon group of $R^{2\prime}$ include methylene group and further include the same substituents as those of $R^2$. $R^1$, $R^3$ to $R^6$, X, m, n, r, p, and a and b have the same meaning as above.

Specific examples of the unsaturated bond-containing organic silazane compound represented by general formula (2) include cyclic oligosilazane compounds such as 1,3,5-trimethyl-1,3,5-trivinylcyclotrisilazane, 1,3,5,7-tetramethyl-1,3,5,7-tetravinylcyclotetrasilazane, 1,3,5,7,9-pentamethyl-1,3,5,7,9-pentavinylcyclopentasilazane, 1,3,5,7,9,11-hexamethyl-1,3,5,7,9,11-hexavinylcyclohexasilazane, 1,3,5-trimethyl-1,3,5-trihexenylcyclotrisilazane, 1,3,5,7-tetramethyl-1,3,5,7-tetrahexenylcyclotetrasilazane, 1,3,5-trimethyl-1,3,5-trioctenylcyclotrisilazane, and 1,3,5,7-tetramethyl-1,3,5,7-tetraoctenylcyclotetrasilazane; condensation polymers of a chlorosilane compound and ammonia such as a condensation polymer of methylvinyldichlorosilane and ammonia, a condensation polymer of methylhexenyldichlorosilane and ammonia, a condensation polymer of methyloctenyldichlorosilane and ammonia, a condensation polymer of dichloromethylsilylpropyl allyl ether and ammonia, a condensation polymer of dichloromethylsilylpropyl allyl sulfide and ammonia, a condensation polymer of 1-methyldichlorosilylethyldimethylsilyl-4-dimethylvinylsilyl-benzene and ammonia, a condensation polymer of 1-methyldichlorosilylethyl-3-vinyl-1,1,3,3-tetramethyldisiloxane and ammonia; a condensation polymer of 1-methyldichlorosilylethyl-9-vinyl-1,1,3,3,5,5,7,7,9,9-decamethylpentasiloxane and ammonia, a condensation polymer of 1-methyldichlorosilylethyl-9-vinyl-1,1,3,5,7,9,9-heptamethyl-3,5,7-tris (3,3,3-trifluoropropyl)-pentasiloxane and ammonia, a condensation polymer of 1-methyldichlorosilyl-3,3,4,4,5,5,6,6-octafluoro-7-octene and ammonia, a condensation polymer of 1-methyldichlorosilyl-3,3,4,4,5,5,6,6,7,7,8,8-dodecafluoro-9-decene and ammonia, a condensation polymer of vinyltrichlorosilane and ammonia, a condensation polymer of hexenyltrichlorosilane and ammonia, a condensation polymer of octenyltrichlorosilane and ammonia, a condensation polymer of trichlorosilylpropyl allyl ether and ammonia, a condensation polymer of trichlorosilylpropyl allyl sulfide and ammonia, a condensation polymer of 1-trichlorosilylethyldimethylsilyl-4-dimethylvinylsilyl-benzene and ammonia, a condensation polymer of 1-trichlorosilylethyl-3-vinyl-1,1,3,3-tetramethyldisiloxane and ammonia, a condensation polymer of 1-trichlorosilylethyl-9-vinyl-1,1,3,3,5,5,7,7,9,9-decamethylpentasiloxane and ammonia, a condensation polymer of 1-trichlorosilylethyl-9-vinyl-1,1,3,5,7,9,9-heptamethyl-3,5,7-tris(1,1,1-trifluoropropyl)-pentasiloxane and ammonia, a condensation polymer of 1-trichlorosilyl-3,3,4,4,5,5,6,6-octafluoro-7-octene and ammonia, and a condensation polymer of 1-trichlorosilyl-3,3,4,4,5,5,6,6,7,7,8,8-dodecafluoro-9-decene and ammonia, and condensation polymers of multiple chlorosilane compounds and ammonia such as a condensation polymer of methyltrichlorosilane, methylvinyltrichlorosilane, and ammonia, a condensation polymer of methyltrichlorosilane, vinyltrichlorosilane, and ammonia, a condensation polymer of propyllichlorosilane, methylvinyltrichlorosilane, and ammonia, a condensation polymer of propyltrichlorosilane, vinyltrichlorosilane, and ammonia, a condensation polymer of hexyltrichlorosilane, methylvinyltrichlorosilane, and ammonia, a condensation polymer of hexyltrichlorosilane, vinyltrichlorosilane, and ammonia, a condensation polymer of octyltrichlorosilane, methylvinyltrichlorosilane, and ammonia, a condensation polymer of octyltrichlorosilane, vinyltrichlorosilane, and ammonia, a condensation polymer of decyltrichlorosilane, methylvinyltrichlorosilane, and ammonia, and a condensation polymer of decyltrichlorosilane, vinyltrichlorosilane, and ammonia.

The number average molecular weight in terms of polystyrene by GPC of these condensation polymers is preferably 250 to 100,000, more preferably 250 to 30,000, and still more preferably 250 to 10,000.

Specific examples of the hydrogensilane compound represented by the general formula (3) include trialkoxysilane compounds such as trimethoxysilane, triethoxysilane, tripropoxysilane, triisopropoxysilane, and tributoxysilane; alkyldialkoxysilane compounds such as methyldimethoxysilane, methyldiethoxysilane, ethyldimethoxysilane, and phenyldimethoxysilane; and dialkylalkoxysilane compounds such as dimethylmethoxysilane, dimethylethoxysilane, and diphenylethoxysilane.

Specific examples of the hydrogensilane compound represented by general formula (4) if X is oxygen include trialkoxysiloxysiloxane compounds such as 1,1,1-trimethoxysiloxy-3,3,5,5,7,7,9,9-octamethylpentasiloxane, 1,1,1-trimethoxysiloxy-3,3,5,5,7,7,9,9,11,11,13,13,15,15-tetradecamethyloctasiloxane, 1,1,1-trimethoxysiloxy-3,3,5,5,7,7,9,9,11,11,13,13,15,15,17,17,19,19,21,21-icosamethylundecasiloxane, 1,1,1-triethoxysiloxy-3,3,5,5,7,7,9,9-octamethylpentasiloxane, 1,1,1-triethoxysiloxy-3,3,5,5,7,7,9,9,11,11,13,13,15,15-tetradecamethyloctasiloxane, and 1,1,1-triethoxysiloxy-3,3,5,5,7,7,9,9,11,11,13,13,15,15,17,17,19,19,21,21-icosamethylundecasiloxane dialkoxysiloxysiloxane compounds such as 1,1-dimethoxysiloxy-1,3,3,5,5,7,7,9,9-nonamethylpentasiloxane, 1,1-dimethoxysiloxy-1-phenyl-3,3,5,5,7,7,9,9-octamethylpentasiloxane, 1,1-dimethoxysiloxy-1-vinyl-3,3,5,5,7,7,9,9-octamethylpentasiloxane, 1,1-diethoxysiloxy-1,3,3,5,5,7,7,9,9-nonamethylpentasiloxane, 1,1-diethoxysiloxy-1-phenyl-3,3,5,5,7,7,9,9-octamethylpentasiloxane, and 1,1-diethoxysiloxy-1-vinyl-3,3,5,5,7,7,9,9-octamethylpentasiloxane; and monoalkoxysiloxysiloxane compounds such as 1-methoxysiloxy-1,1,3,3,5,5,7,7,9,9-decamethylpentasiloxane, 1-methoxysiloxy-1-phenyl-1,3,3,5,5,7,7,9,9-nonamethylpentasiloxane, 1-methoxysiloxy-1-vinyl-1,3,3,5,5,7,7,9,9-nonamethylpentasiloxane, 1-ethoxysiloxy-1,1,3,3,5,5,7,7,9,9-decamethylpentasiloxane, 1-ethoxysiloxy-1-phenyl-1,3,3,5,5,7,7,9,9-nonamethylpentasiloxan, and 1-ethoxysiloxy-1-vinyl-1,3,3,5,5,7,7,9,9-nonamethylpentasiloxane.

Specific examples of the hydrogensilane compound represented by general formula (4) if X is a divalent hydrocarbon group include trialkoxysilylalkyl-siloxane compounds such as 1-trimethoxysilylethyl-1,1,3,3-tetramethyldisiloxane, 1-triethoxysilylethyl-1,1,3,3-tetramethyldisiloxane, 1-tripropoxysilylethyl-1,1,3,3-tetramethyldisiloxane, 1-triisopropoxysilylethyl-1,1,3,3-tetramethyldisiloxane, 1-trimethoxysilylhexyl-1,1,3,3-tetramethyldisiloxane, 1-triethoxysilylhexyl-1,1,3,3-tetramethyldisiloxane, 1-trimethoxysilyloctyl-1,1,3,3-tetramethyldisiloxane, 1-triethoxysilyloctyl-1,1,3,3-tetramethyldisiloxane, 1-trimethoxysilylethyl-1,1,3,3,5,5,7,7,9,9-decamethylpentasiloxane, 1-triethoxysilylethyl-1,1,3,3,5,5,7,7,9,9-decamethylpentasiloxane, 1-trimethoxysilylethyl-1,1,3,3,5,5,7,7,9,9,11,11,13,13,15,15-hexadecamethyloctasiloxane, and 1-triethoxysilylethyl-1,1,3,3,5,5,7,7,9,9,11,11,13,13,15,15-hexadecamethyloctasiloxane, and alkyldialkoxysilylalkylsiloxane compounds such as 1-methyldimethoxysilylethyl-1,1,3,3-tetramethyldisiloxane, 1-methyldiethoxysilylethyl-1,1,3,3-tetramethyldisiloxane, 1-methyldimethoxysilyloctyl-1,1,3,3-tetramethyldisiloxane, 1-methyldiethoxysilyloctyl-1,1,3,3-tetramethyldisiloxane, 1-methyldimethoxysilylethyl-1,1,3,3,5,5,7,7,9,9-decamethylpentasiloxane, 1-methyldiethoxysilylethyl-1,1,3,3,5,5,7,7,9,9-decamethylpentasiloxane, 1-ethyldimethoxysilylethyl-1,1,3,3-tetramethyldisiloxane, 1-ethyldiethoxysilylethyl-1,1,3,3-tetramethyldisiloxane, 1-phenyldimethoxysilylethyl-1,1,3,3-tetramethyldisiloxane, and 1-phenyldiethoxysilylethyl-1,1,3,3-tetramethyldisiloxane; alkyldialkoxysilylalkylsiloxane compounds such as 1-dimethylmethoxysilylethyl-1,1,3,3-tetramethyldisiloxane, 1-dimethylethoxysilylethyl-1,1,3,3-tetramethyldisiloxane, 1-dimethylmethoxysilyloctyl-1,1,3,3-tetramethyldisiloxane, 1-dimethylethoxysilyloctyl-1,1,3,3-tetramethyldisiloxane, 1-dimethylmethoxysilylethyl-1,1,3,3,5,5,7,7,9,9-decamethylpentasiloxane, 1-dimethylethoxysilylethyl-1,1,3,3,5,5,7,7,9,9-decamethylpentasiloxane, 1-diethylmethoxysilylethyl-1,1,3,3-tetramethyldisiloxane, 1-diethylethoxysilylethyl-1,1,3,3-tetramethyldisiloxane, 1-diphenylmethoxysilylethyl-1,1,3,3-tetramethyldisiloxane, and 1-diphenylethoxysilylethyl-1,1,3,3-tetramethyldisiloxane; and alkoxysilylfluoroalkyl-siloxane compounds such as 1-(3,3,4,4,5,5,6,6-octafluoro-8-trimethoxysilyl)octyl-1,1,3,3-tetramethyldisiloxane, 1-(3,3,4,4,5,5,6,6-octafluoro-8-triethoxysilyl)octyl-1,1,3,3-tetramethyldisiloxane, 1-(3,3,4,4,5,5,6,6,7,7,8,8-dodecafluoro-10-trimethoxysilyl)decyl-1,1,3,3-tetramethyldisiloxane, 1-(3,3,4,4,5,5,6,6,7,7,8,8-dodecafluoro-10-triethoxysilyl)decyl-1,1,3,3-tetramethyldisiloxane, 1-(3,3,4,4,5,5,6,6-octafluoro-8-methyldimethoxysilyl)octyl-1,1,3,3-tetramethyldisiloxane, and 1-(3,3,4,4,5,5,6,6-octafluoro-8-methyldiethoxysilyl)octyl-1,1,3,3-tetramethyldisiloxane.

Though the compounding ratio of the unsaturated bond-containing organic silazane compound represented by the general formula (2) to the hydrogensilane compound represented by the general formula (3) or (4) is not particularly limited, the amount of the hydrogensilane compound represented by the general formula (3) or (4) per 1 mol of the unsaturated bond contained in the unsaturated bond-containing organic silazane compound represented by the general formula (2) is preferably 0.1 to 1.5 mol, more preferably 0.2 to 1.2 mol, and still more preferably 0.3 to 1.0 mol from the viewpoint of the utility and productivity of the reactant.

In the reaction of the unsaturated bond-containing silazane compound represented by the general formula (2) with the hydrogensilane compound represented by the general formula (3) or (4), a platinum compound is used as a catalyst. Specific examples of the platinum compound include chloroplatinic acid, an alcohol solution of chloroplatinic acid, a toluene or xylene solution of platinum-1,3-divinyl-1,1,3,3-tetramethyldisiloxane complex, tetrakistriphenylphosphine platinum, dichlorobistriphenylphosphine platinum, dichlorobisacetonitrile platinum, dichlorobisbenzonitrile platinum, dichlorocyclooctadiene platinum, and platinum-activated carbon.

Though the amount of the platinum compound used is not particularly limited, the amount is preferably 0.000001 to 0.2 mol, more preferably 0.00001 to 0.1 mol per 1 mol of the unsaturated bond contained in the unsaturated bond-containing organic silazane compound represented by the general formula (2) from the viewpoint of productivity.

Though the reaction temperature of the reaction is not particularly limited, the reaction temperature is preferably 0 to 200° C., more preferably 20 to 150° C. from the viewpoint of product stability. Though the reaction time is also not particularly limited, the reaction time is preferably 1 to 40 hours, more preferably 1 to 20 hours from the viewpoint of product stability.

To prevent deactivation of the catalyst and hydrolysis of the silazane compound having an unsaturated bond and the hydrogensilane compound, the reaction is preferably performed under atmosphere of an inert gas such as nitrogen and argon.

Though the reaction proceeds without a solvent, a solvent can be used. Specific examples of the solvent include a solvent of aliphatic hydrocarbons having 5 to 20 carbon atoms such as pentane, hexane, cyclohexane, heptane, octane, nonane, decane, isooctane, and isododecane, a solvent of aromatic hydrocarbons having 6 to 10 carbon atoms such as benzene, toluene, and xylene; a solvent of ethers such as diethyl ether, tetrahydrofuran, dioxane, and dipropylene glycol dimethyl ether; a solvent of esters such as ethyl acetate and butyl acetate; aprotic polar solvents such as acetonitrile, N,N-dimethylformamide, and N-methylpyrrolidone, silicone solvents such as hexamethyldisiloxane, tris(trimethylsiloxy)methylsilane, octamethylcyclotetrasiloxane, and decamethylcyclopentasiloxane, and these solvents can be used alone or in combination of two or more.

If $R^2$ in the general formula (1) contains a sulfur atom, the alkoxysilyl group-containing organic silazane compound represented by the general formula (1) in the present invention is preferably produced by reacting in the presence of a radical generator the unsaturated bond-containing silazane compound represented by general formula (2) below with the mercapto group-containing silane compound represented by the general formula (5) below. If $R^2$ in the general formula (1) contains a sulfur atom, the sulfur atom may act as a catalyst poison if the unsaturated bond-containing silane compound is reacted in the presence of a platinum catalyst with a hydrogen compound. Thus, the unsaturated bond-containing silane compound is preferably reacted in the presence of a radical generator with the mercapto-containing silane compound from the viewpoint of the production at higher reaction efficiency.

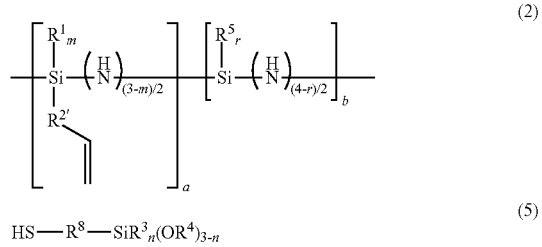

$$\mathrm{HS{-}R^8{-}SiR^3{}_n(OR^4)_{3-n}} \quad (5)$$

In the formula (2), $R^1$, $R^2$, $R^5$, m, r, and a and b have the same meaning as above.

In general formula (5), $R^8$ is a divalent hydrocarbon group having 1 to 18 carbon atoms, preferably 1 to 8 carbon atoms.

Specific examples of the divalent hydrocarbon group of $R^8$ include linear alkylene groups such as methylene group, ethylene group, trimethylene group, tetramethylene group, hexamethylene group, octamethylene group, and decamethylene group; branched alkylene groups such as propylene (methylethylene) group and methyltrimethylene group; cyclic alkylene groups such as cyclohexylene group and methylenecyclohexylenemethylene group; alkenylene groups such as propenylene group, butenylene group, hexenylene group, and octenylene group; arylene groups such as phenylene group; and aralkylene groups such as methylenephenylene group and methylenephenylenemethylene group.

$R^3$, $R^4$ and n in the general formula (5) have the same meaning as above.

Specific examples of the mercapto group-containing silane compound represented by the general formula (5) include mercaptoalkyltrialkoxysilane compounds such as mercaptopropyltrimethoxysilane, mercaptopropyltriethoxysilane, mercaptopropyltripropoxysilane, mercaptopropyltriisopropoxysilane, mercaptomethyltrimethoxysilane, mercaptoethyltriethoxysilane, mercaptohexyltrimethoxysilane, mercaptohexyltriethoxysilane, mercaptooctyltrimethoxysilane, and mercaptooctyltriethoxysilane; mercaptoalkylalkyldialkoxysilanes such as mercaptopropylmethyldimethoxysilane, mercaptomethylmethyldimethoxysilane, mercaptohexylmethyldimethoxysilane, mercaptooctylmethyldimethoxysilane, mercaptopropylphenyldimethoxysilane, mercaptomethylphenyldimethoxysilane, mercaptohexylphenyldimethoxysilane, and mercaptooctylphenyldimethoxysilane; mercaptoalkyldialkylalkoxysilanes such as mercaptopropyldimethylmethoxysilane, mercaptomethyldimethylmethoxysilane, mercaptopropyldiphenylmethoxysilane, and mercaptomethyldiphenylmethoxysilane; mercaptoarylalkoxysilanes such as 1-mercapto-4-trimethoxysilylbenzene, 1-mercapto-4-methyldimethoxysilylbenzene, 1-mercapto-4-dimethylmethoxysilylbenzene, 1-mercapto-4-triethoxysilylbenzene, 1-mercapto-4-methyldiethoxysilylbenzene, and 1-mercapto-4-dimethylethoxysilylbenzene; and mercaptoarylenealkoxysilanes such as 1-mercaptoethyl-4-trimethoxysilylbenzene, 1-mercapto-4-trimethoxysilylethylbenzene, and 1-mercaptoethyl-4-trimethoxysilylethylbenzene.

Though the compounding ratio of the unsaturated bond-containing organic silazane compound represented by the general formula (2) to the mercapto group-containing silane compound represented by the general formula (5) is not particularly limited, the amount of the mercapto group-containing silane compound represented by the general formula (5) per 1 mol of the unsaturated bond contained in the unsaturated bond-containing organic silazane compound represented by the general formula (2) is preferably 0.1 to 1.5 mol, more preferably 0.2 to 1.2 mol, and still more preferably 0.3 to 1.0 mol from the viewpoint of the utility and the reactivity of the product.

In the reaction of the unsaturated bond-containing silane compound represented by the general formula (2) with the mercapto group-containing silane compound represented by the general formula (5), a radical generator is used as a catalyst. Specific examples of the radical generator include organic peroxides such as tert-butylhydroperoxide, ditert-butylperoxide, and benzoyl peroxide, and azo compounds such as azobisisobutyronitrile and azobis-2-methylbutyronitrile, and azo compounds are particularly preferred.

Though the amount of the radical generator used is not particularly limited, the amount is preferably 0.0001 to 0.2 mol, more preferably 0.001 to 0.1 mol per 1 mol of the unsaturated bond contained in the unsaturated bond-containing organic silazane compound represented by the general formula (2) from the viewpoint of productivity.

Though the reaction temperature of the reaction is not particularly limited, the reaction temperature is preferably 0 to 200° C., more preferably 20 to 150° C. from the viewpoint of avoiding undesired side reactions.

Though the reaction time is also not particularly limited, the reaction time is preferably 1 to 40 hours, more preferably 1 to 20 hours from the viewpoint of avoiding undesired side reactions.

To prevent hydrolysis of the mercapto group-containing silane compound, the reaction is preferably performed under atmosphere of an inert gas such as nitrogen and argon.

Though the reaction proceeds without a solvent, a solvent can be used.

Specific examples of the solvent include the same solvents as those used for the reaction with the hydrogensilane compound, and toluene and xylene are preferred from the viewpoint of the solubility of the catalyst, in particular, if an azo compound is used as a catalyst.

[Composition and Cured Product]

A composition including the alkoxysilyl group-containing organic silazane compound, and at least one metal compound which can be used as a curing catalyst selected from the group consisting of a titanium compound, an aluminum compound, a zinc compound and a tin compound is described below.

Examples of the metal compound include tetraalkyl orthotitanates such as tetrabutyl orthotitanate, tetramethyl orthotitanate, tetraethyl orthotitanate, tetrapropyl orthotitanate, and tetraisopropyl orthotitanate, partially hydrolyzed condensates, and titanium compounds such as titanium acylate; aluminum compounds such as aluminum trihydroxide, aluminum alcoholate, aluminum acylate, aluminum acylate salts, aluminosyloxy compounds, and aluminum metal chelate compounds; tin compounds such as dioctyltin dioctate and dioctyltin dilaurate; and zinc compounds such as zinc octylate and zinc 2-ethylhexanoate.

Though the compounding amount of the metal compound is not particularly limited, the amount is preferably 0.01 to 10% by weight, more preferably 0.1 to 5% by weight per the alkoxysilyl group-containing organic silazane compound from the viewpoint of sufficiently obtaining the catalyst effect.

The composition can contain a solvent. Examples of the solvent include the same solvents as those used in the method for producing the alkoxysilyl group-containing organic silazane compound, and from the viewpoint of workability and safety, aliphatic hydrocarbon compounds having 8 to 14 carbon atoms, silicone compounds having 2 to 5 silicon atoms, diethylene glycol dialkyl ether, triethylene glycol dialkyl ether, dipropylene glycol dialkyl ether and the like are preferred, and among them, a mixture of isoparaffin compounds having a boiling point of 100 to 220° C., hexamethyldisiloxane, octamethyltrisiloxane, decamethyltetrasiloxane, tris(trimethylsiloxy)methylsilane, dipropylene glycol dimethyl ether and the like are more preferred.

The amount of the solvent added is preferably 50 to 1,000 parts by weight, and more preferably 100 to 500 parts by weight per 100 parts by weight of the alkoxysilyl group-containing organic silazane compound.

The composition can contain one or more other additives selected from a pigment, an antifoaming agent, a lubricant, a preservative, a pH adjuster, a film forming agent, an antistatic agent, an antibacterial agent, a dye and the like as long as the effect of the present invention is not impaired.

If the composition is cured to obtain a cured product, the solvent can be volatilized in advance or do not need to be volatilized, or the composition can be cured while volatilizing the solvent.

The composition can usually be cured by the reaction with moisture in the air, and the curing temperature can be from room temperature to heating temperature. The curing temperature is not particularly limited as long as it does not adversely affect the substrate, and it is usually 0 to 200° C., preferably 0 to 100° C., more preferably 25 to 50° C. to maintain reactivity.

A process for forming a coating with the cured product is described below. Examples of the process for forming a coating with the composition include a process in which the surface of the object on which a coating is formed is covered with the composition, and then the composition is cured by reacting the composition with moisture in the air.

The object on which a coating is formed can be an inorganic material or an organic material. Examples of the inorganic material include metal, glass, silica, alumina, talc, calcium carbonate, and carbon. The shapes thereof are not particularly limited, and can be a plate shape, a sheet shape, a fiber shape, or a powder shape. As the glass, commonly used types of glass such as E glass, C glass, and quartz glass can be used. The glass fiber can be an aggregate thereof, and can be, for example, a bundle of glass (filament) fibers having a fiber diameter of 3 to 30 μm, a twine, a fabric and the like. Examples of the organic material include resin materials such as polyethylene, polypropylene, polystyrene, poly(meth)acryl, polyvinyl chloride, polycarbonate, nylon, polyurethane, polybutylene terephthalate, polyethylene terephthalate, ABS (polymer of acrylonitrile, butadiene, and styrene), melamine, phenol, epoxy, and polyimide, and elastomers and rubber materials such as polybutadiene rubber, polyisopropylene rubber, nitrile rubber, neoprene rubber, polysulfide, and urethane rubber, and the shapes thereof are not particularly limited, and can be a plate shape, a sheet shape, a fiber shape, or a powder shape.

As a process for covering the object on which a coating is formed, known coating methods such as brush application method, sponge application method, cloth application method, spray coating method, wire bar method, blade method, roll coating method, dipping method, and spin coating method can be used.

For powder materials such as silica, alumina, talc, and calcium carbonate, a mixing method can be employed in which the composition is mixed directly using a mixer or a mill together with the object on which a coating is formed.

The coating of the composition reacts with moisture in the air to quickly form a cured coating. Further, it exhibits excellent alcohol resistance. The composition is useful as a coating agent for outdoor painting because the surface of the coating has no significant deterioration, for example, even if ethanol or isopropanol is dropped on the surface of the coating, the surface is wiped with a cloth dampened with ethanol or isopropanol, or the surface is wiped with a detergent containing ethanol or isopropanol.

EXAMPLES

Hereinafter, though the present invention is specifically described by way of Examples and Comparative Examples, the present invention is not limited to Examples below. In

Example 1-1

Synthesis of Silazane Compound 1 by Reaction of 2,4,6-Trimethyl-2,4,6-Trivinylcyclotrisilazane with Trimethoxysilane

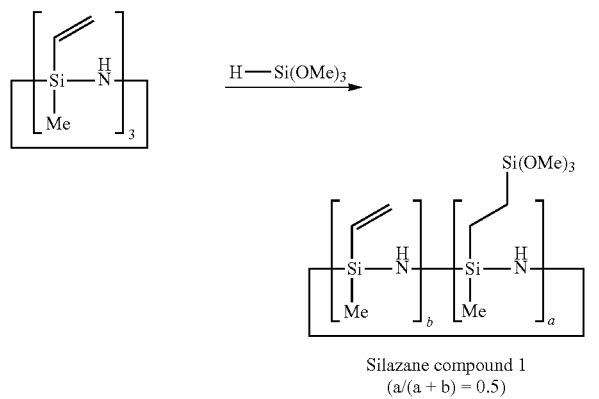

Silazane compound 1
(a/(a + b) = 0.5)

To a flask equipped with a stirrer, a reflux condenser, a dropping funnel, and a thermometer, 306.6 g (1.200 mol) of 2,4,6-trimethyl-2,4,6-trivinylcyclotrisilazane and 0.49 g (0.00075 mol in terms of platinum) of a toluene solution of platinum-1,3-divinyl-1,1,3,3-tetramethyldisiloxane complex were added and heated to 60° C. While maintaining the temperature at 70° C. or lower, 220.0 g (1.800 mol) of trimethoxysilane was added from the dropping funnel over 9 hours, and further stirred at the same temperature for 2 hours. The obtained reaction liquid was heated at 140° C./0.4 kPa for 2 hours to remove low boiling components and then filtered to obtain 503.2 g of a reaction liquid.

Figure 2:
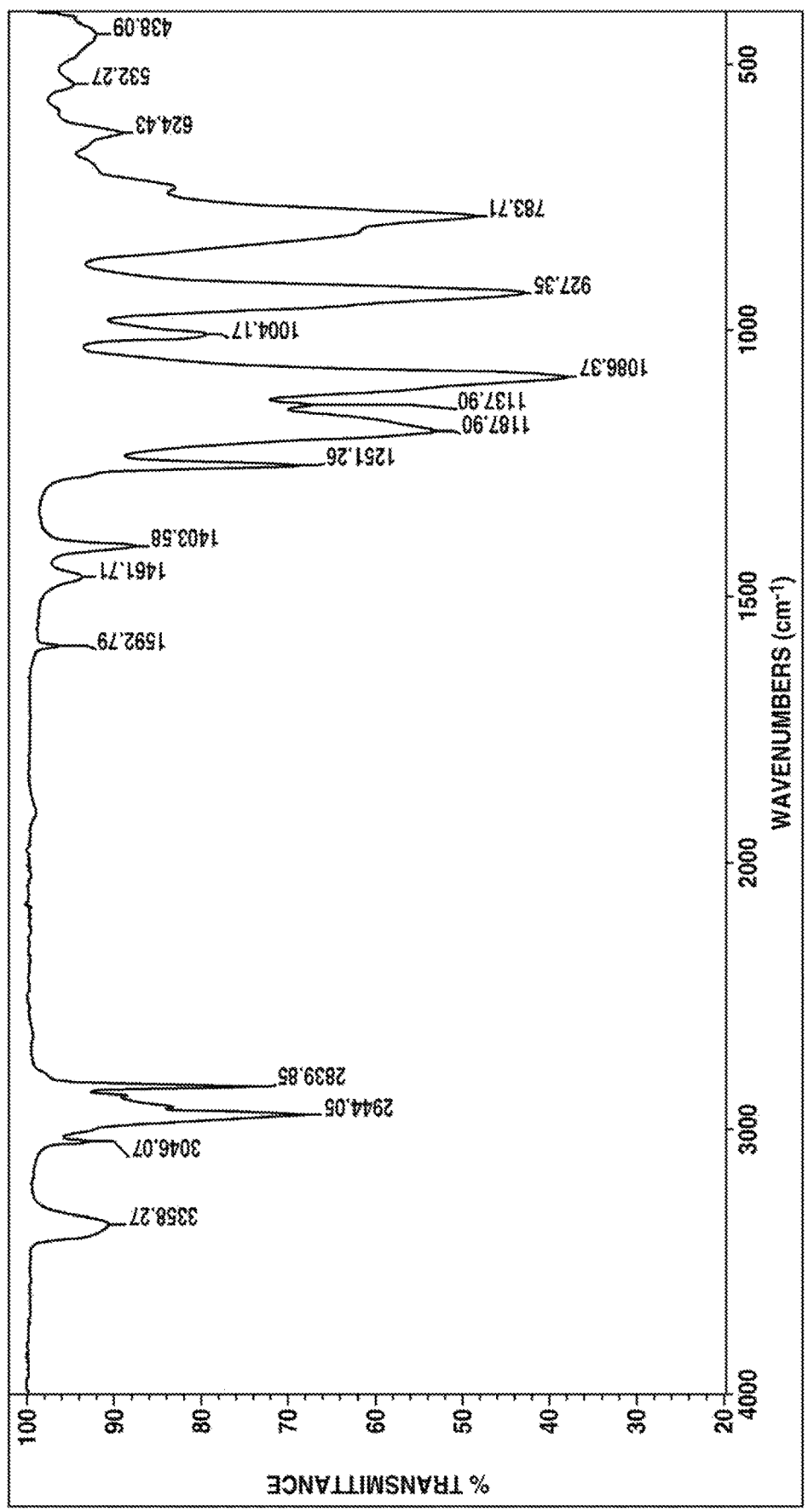
FIG. 2 is an IR spectrum of the silazane compound obtained in Example 1-1.

From the results of $^1$H-NMR (deuterated chloroform solvent) and IR analysis of the reaction liquid, production of Silazane compound 1 was confirmed. The $^1$H-NMR spectrum is shown in FIG. 1, and the IR spectrum is shown in FIG. 2.

Example 1-2

Synthesis of Silazane Compound 2 by Reaction of 2,4,6-Trimethyl-2,4,6-Trivinylcyclotrisilazane with Trimethoxysilane

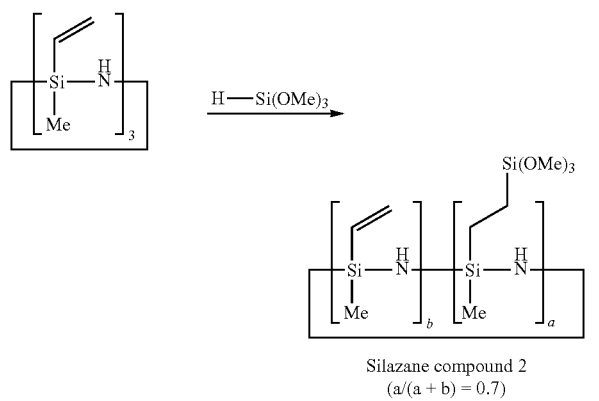

Silazane compound 2
(a/(a + b) = 0.7)

The same procedure as in Example 1-1 were performed except that the raw materials added to the flask were changed to 12.7 g (0.0498 mol) of 2,4,6-trimethyl-2,4,6-trivinylcyclotrisilazane and 0.0211 g (0.00000325 mol in terms of platinum) of a toluene solution of platinum-1,3-divinyl-1,1,3,3-tetramethyldisiloxane complex, and the raw material added from the dropping funnel was changed to 12.8 g (0.105 mol) of trimethoxysilane. After filtration, 25.0 g of the reaction liquid was obtained.

From the results of $^1$H-NMR (deuterated chloroform solvent) and IR analysis of the reaction liquid, production of Silazane compound 2 was confirmed.

Example 1-3

Synthesis of Silazane Compound 3 by Reaction of 2,4,6-Trimethyl-2,4,6-Trivinylcyclotrisilazane with Trimethoxysilane

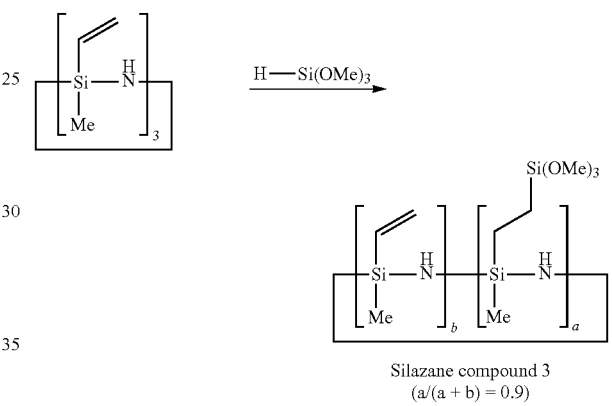

Silazane compound 3
(a/(a + b) = 0.9)

The same procedure as in Example 1-1 were performed except that the raw materials added to the flask were changed to 12.8 g (0.0501 mol) of 2,4,6-trimethyl-2,4,6-trivinylcyclotrisilazane and 0.025 g (0.0000038 mol in terms of platinum) of a toluene solution of platinum-1,3-divinyl-1,1,3,3-tetramethyldisiloxane complex, and the raw material added from the dropping funnel was changed to 16.5 g (0.135 mol) of trimethoxysilane. After filtration, 25.1 g of the reaction liquid was obtained.

From the results of $^1$H-NMR (deuterated chloroform solvent) and IR analysis of the reaction liquid, production of Silazane compound 3 was confirmed.

Example 1-4

Synthesis of Silazane Compound 4 by Reaction of 2,4,6-Trimethyl-2,4,6-Trivinylcyclotrisilazane with Triethoxysilane

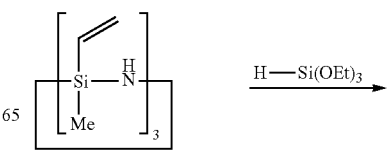

-continued

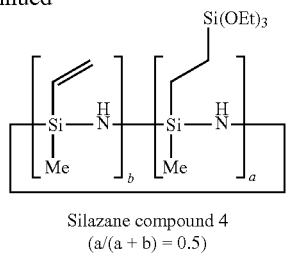

Silazane compound 4
(a/(a + b) = 0.5)

The same procedure as in Example 1-1 were performed except that the raw materials added to the flask were changed to 12.7 g (0.0497 mol) of 2,4,6-trimethyl-2,4,6-trivinylcyclotrisilazane and 20.3 mg (0.0000800 mol in terms of platinum) of a toluene solution of platinum-1,3-divinyl-1,1,3,3-tetramethyldisiloxane complex, and the raw material added from the dropping funnel was changed to 12.3 g (0.0749 mol) of triethoxysilane. After filtration, 24.5 g of the reaction liquid was obtained.

From the results of $^1$H-NMR (deuterated chloroform solvent) and IR analysis of the reaction liquid, production of Silazane compound 4 was confirmed.

Example 1-5

Synthesis of Silazane Compound 5 by Reaction of 2,4,6-Trimethyl-2,4,6-Trivinylcyclotrisilazane with 1-Trimethoxysilylethyl-Tetramethyldisiloxane

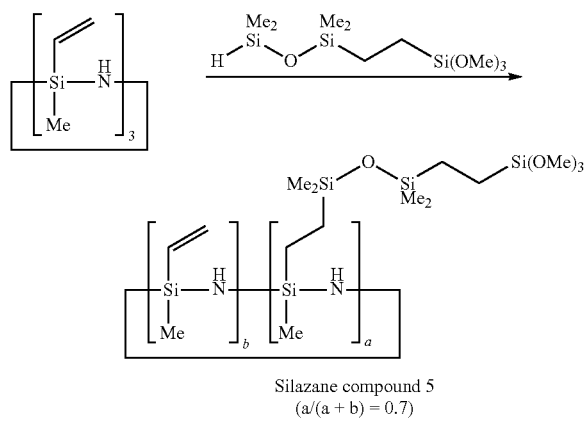

Silazane compound 5
(a/(a + b) = 0.7)

The same procedure as in Example 1-1 were performed except that the raw materials added to the flask were changed to 12.8 g (0.0504 mol) of 2,4,6-trimethyl-2,4,6-trivinylcyclotrisilazane and 0.0975 g (0.000015 mol in terms of platinum) of a toluene solution of platinum-1,3-divinyl-1,1,3,3-tetramethyldisiloxane complex, and the raw material added from the dropping funnel was changed to 29.8 g (0.105 mol) of 1-trimethoxysilylethyl-1,1,3,3-tetramethyldisiloxane. After filtration, 41.0 g of the reaction liquid was obtained.

Figure 3:
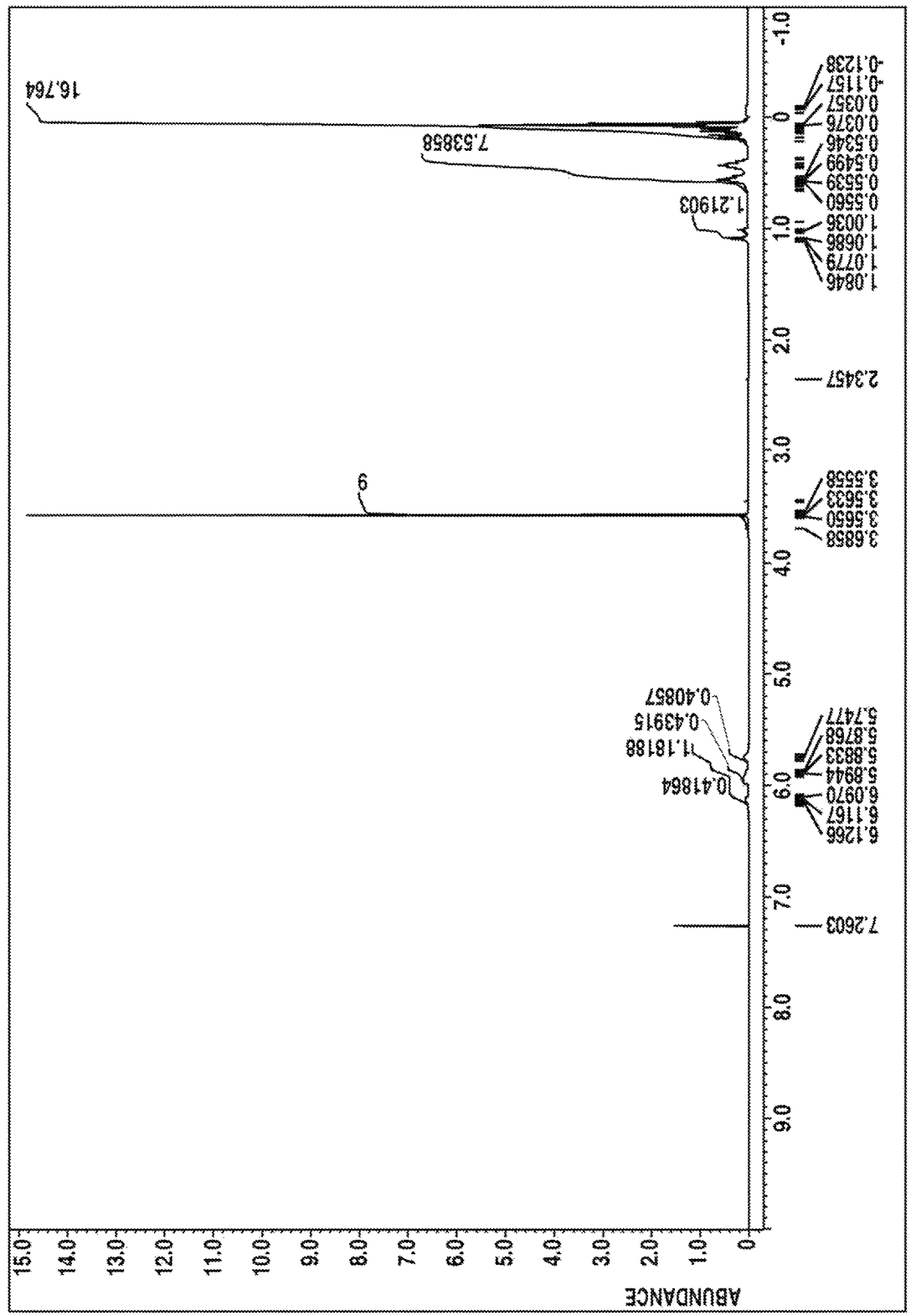
FIG. 3 is a $^1$H-NMR spectrum of the silazane compound obtained in Example 1-5.
Figure 4:
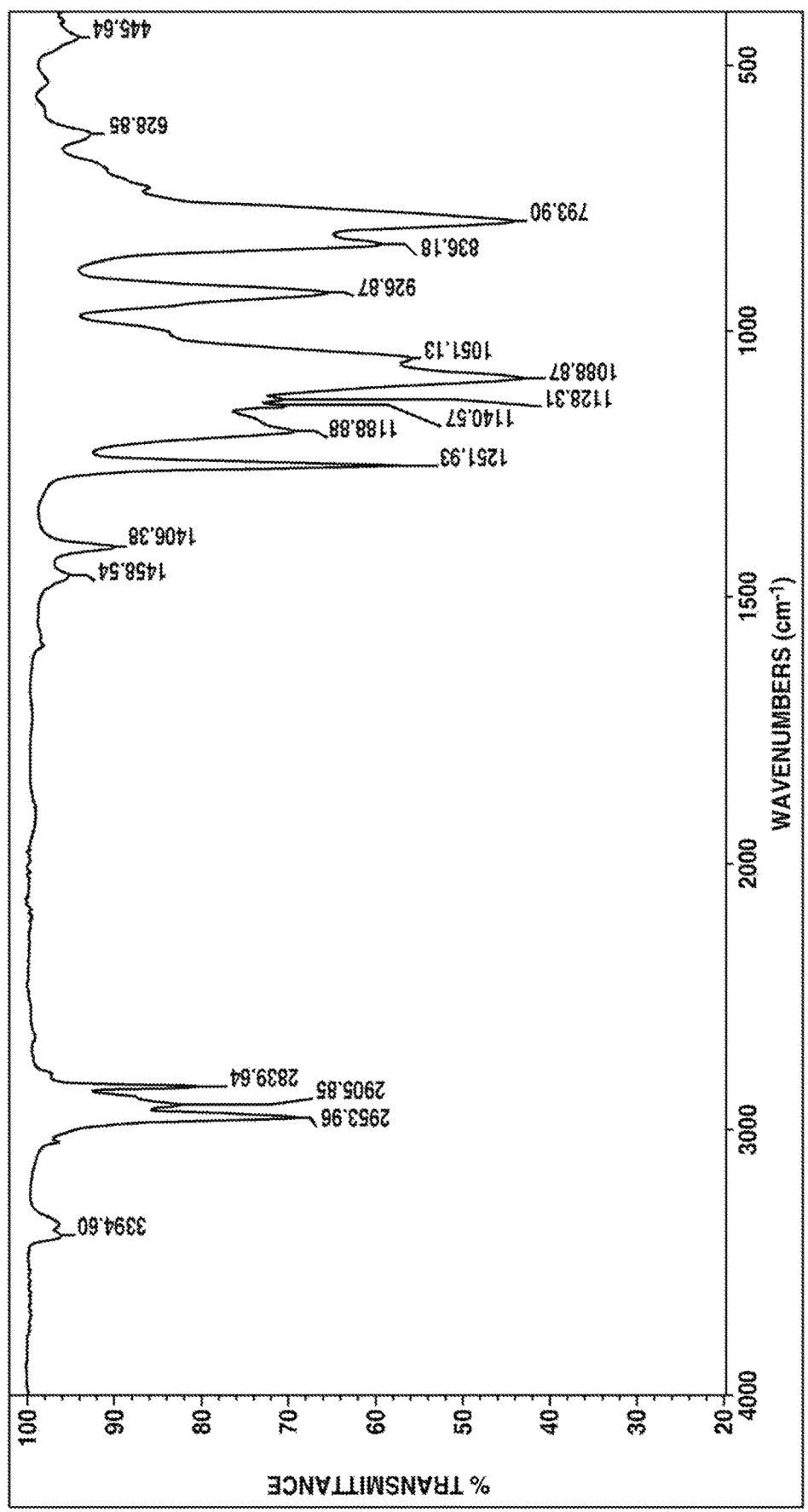
FIG. 4 is an IR spectrum of the silazane compound obtained in Example 1-5.

From the results of $^1$H-NMR (deuterated chloroform solvent) and IR analysis of the reaction liquid, production of Silazane compound 5 was confirmed. The $^1$H-NMR spectrum is shown in FIG. 3, and the IR spectrum is shown in FIG. 4.

Example 1-6

Synthesis of Silazane Compound 6 by Reaction of 2,4,6-Trimethyl-2,4,6-Trivinylcyclotrisilazane with 3-Mercaptopropyltrimethoxysilane

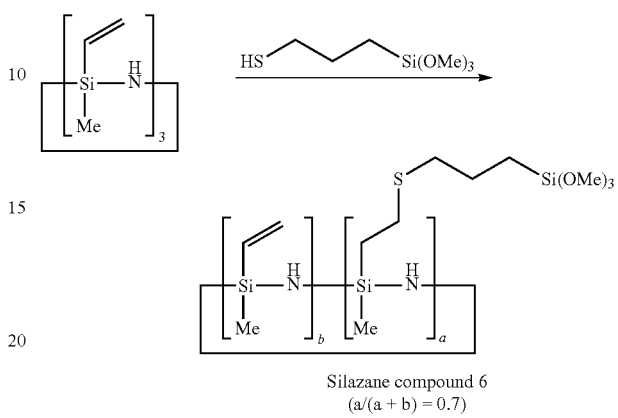

Silazane compound 6
(a/(a + b) = 0.7)

To a flask equipped with a stirrer, a reflux condenser, a dropping funnel, and a thermometer, 20.5 g (0.104 mol) of 3-mercaptopropyltrimethoxysilane was added and heated to 90° C. Then, a liquid mixture of 12.7 g (0.0497 mol) of 2,4,6-trimethyl-2,4,6-trivinylcyclotrisilazane and 0.101 g (0.00525 mol) of 2,2'-azobis(2-methylbutyronitrile) were added from the dropping funnel over 1 hour and stirred at the same temperature for 2 hours. The obtained reaction liquid was heated at 100° C./0.4 kPa to remove low boiling components, thereby 31.0 g of a reaction liquid was obtained.

Figure 5:
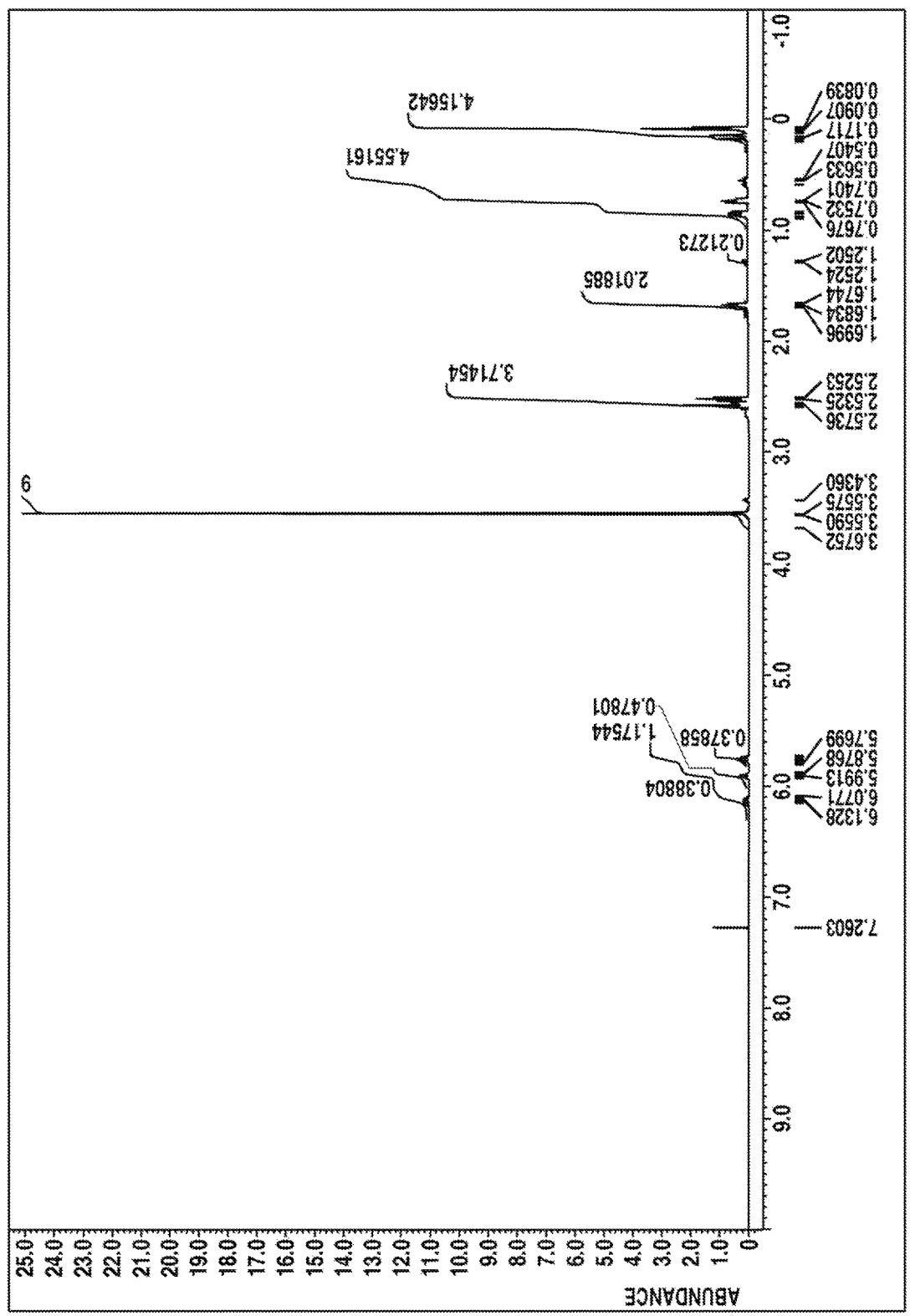
FIG. 5 is a $^1$H-NMR spectrum of the silazane compound obtained in Example 1-6.
Figure 6:
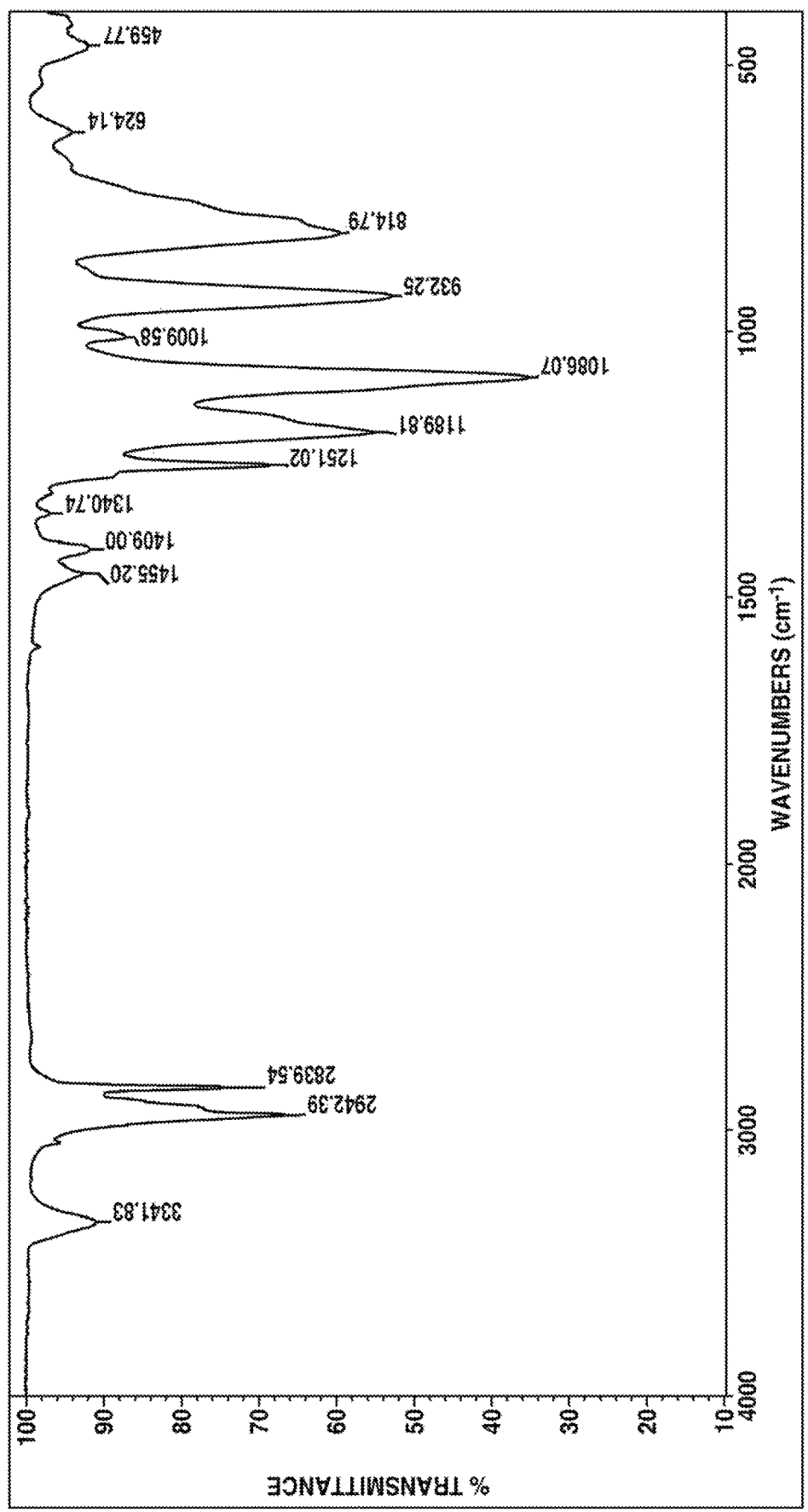
FIG. 6 is an IR spectrum of the silazane compound obtained in Example 1-6.

From the results of $^1$H-NMR (deuterated chloroform solvent) and IR analysis of the reaction liquid, production of Silazane compound 6 was confirmed. The $^1$H-NMR spectrum is shown in FIG. 5, and the IR spectrum is shown in FIG. 6.

Example 1-7

Synthesis of Silazane Compound 7 by Reaction of Polysilazane Compound with Trimethoxysilane

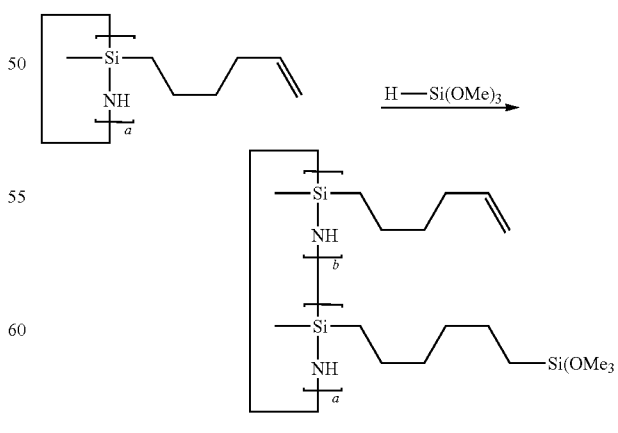

Silazane compound 7
(a/(a + b) = 1.07)

The same procedure as in Example 1-1 were performed except that the raw materials added to the flask were changed to 10.2 g (number average molecular weight: 629) of the polysilazane compound shown in the Figure above and 47.7 mg (0.00000733 mol in terms of platinum) of a toluene solution of platinum-1,3-divinyl-1,1,3,3-tetramethyldisiloxane complex, and the raw material added from the dropping funnel was changed to 6.2 g (0.051 mol) of trimethoxysilane. After filtration, 15.2 g of the reaction liquid was obtained.

Figure 7:
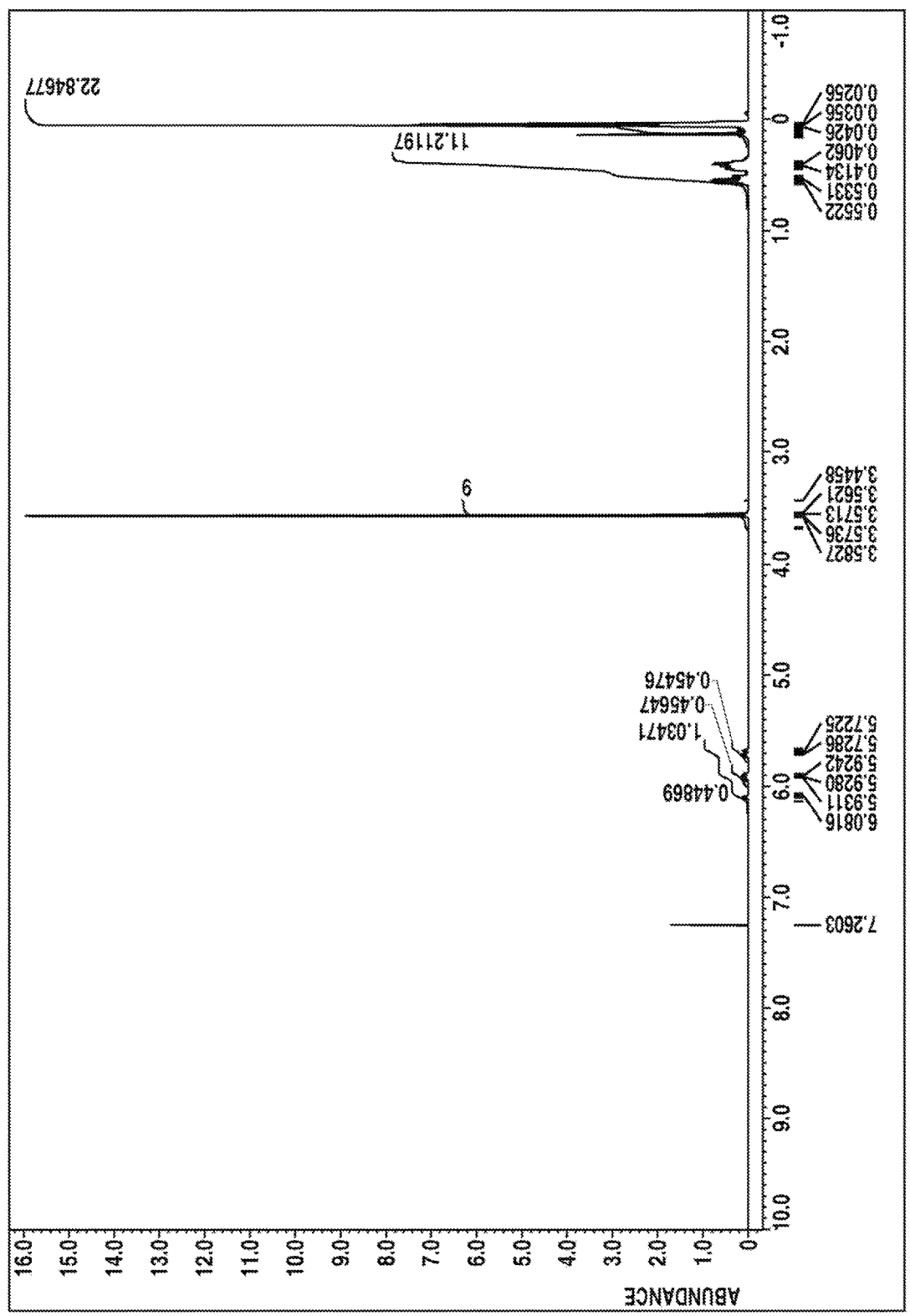
FIG. 7 is a $^1$H-NMR spectrum of the silazane compound obtained in Example 1-7.
Figure 8:
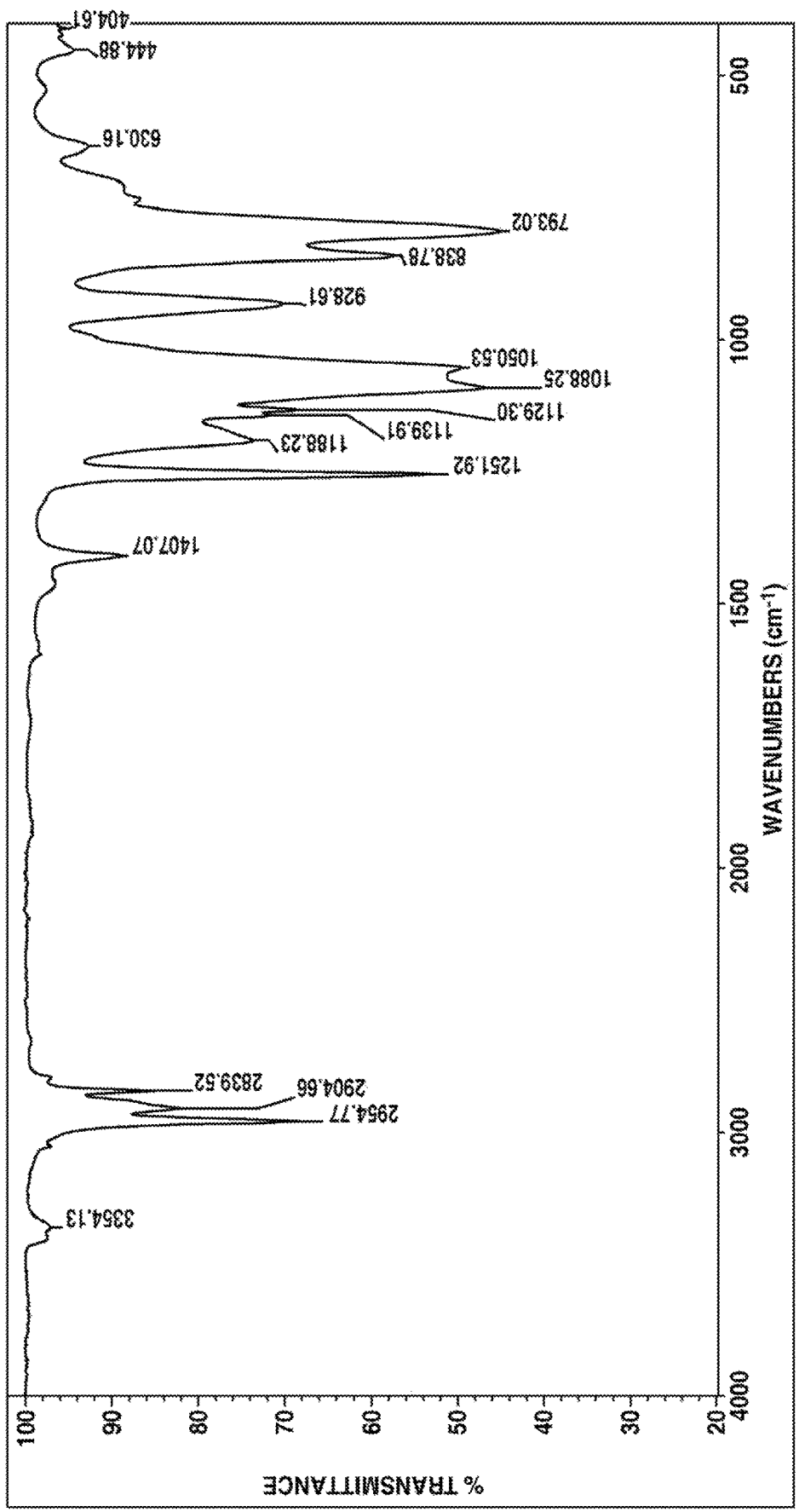
FIG. 8 is an IR spectrum of the silazane compound obtained in Example 1-7.

From the results of $^1$H-NMR (deuterated chloroform solvent) and IR analysis of the reaction liquid, production of Silazane compound 7 was confirmed. The $^1$H-NMR spectrum is shown in FIG. 7, and the IR spectrum is shown in FIG. 8.

GPC analysis was performed under the following conditions, and the number average molecular weight was found to be 992.

[GPC Conditions]
Instrument: HLC-8420GPC EcoSEC Elite-WS (manufactured by Tosoh Corporation)
Column: GPC KF-G 4A (manufactured by Shodex)
GPC KF-404 HQ (manufactured by Shodex)
GPC KF-402.5 HQ (manufactured by Shodex)
Eluant: tetrahydrofuran (THF) (manufactured by KANTO CHEMICAL CO., INC.)
Flow rate: 0.35 mL/min
Detector: RI
Column thermostat temperature: 40° C.
Reference material: polystyrene Example 1-8

Synthesis of Silazane Compound 8 by Reaction of Polysilazane Compound with Trimethoxysilane

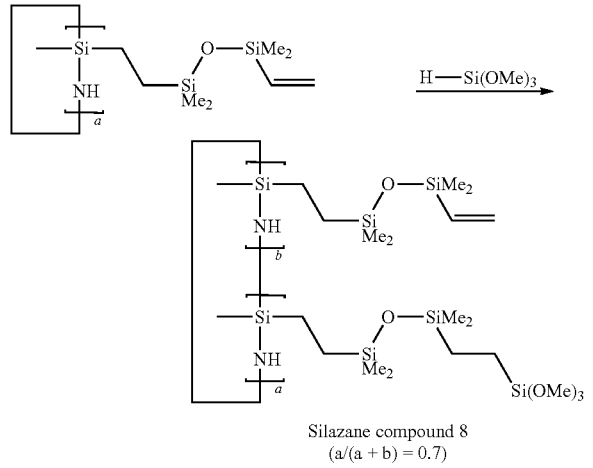

Silazane compound 8
(a/(a + b) = 0.7)

The same procedure as in Example 1-1 were performed except that the raw materials added to the flask were changed to 12.2 g (number average molecular weight: 1,050) of the polysilazane compound shown in the Figure above and 32.3 mg (0.00000497 mol in terms of platinum) of a toluene solution of platinum-1,3-divinyl-1,1,3,3-tetramethyldisiloxane complex, and the raw material added from the dropping funnel was changed to 4.2 g (0.034 mol) of trimethoxysilane. After filtration, 14.3 g of the reaction liquid was obtained.

Figure 9:
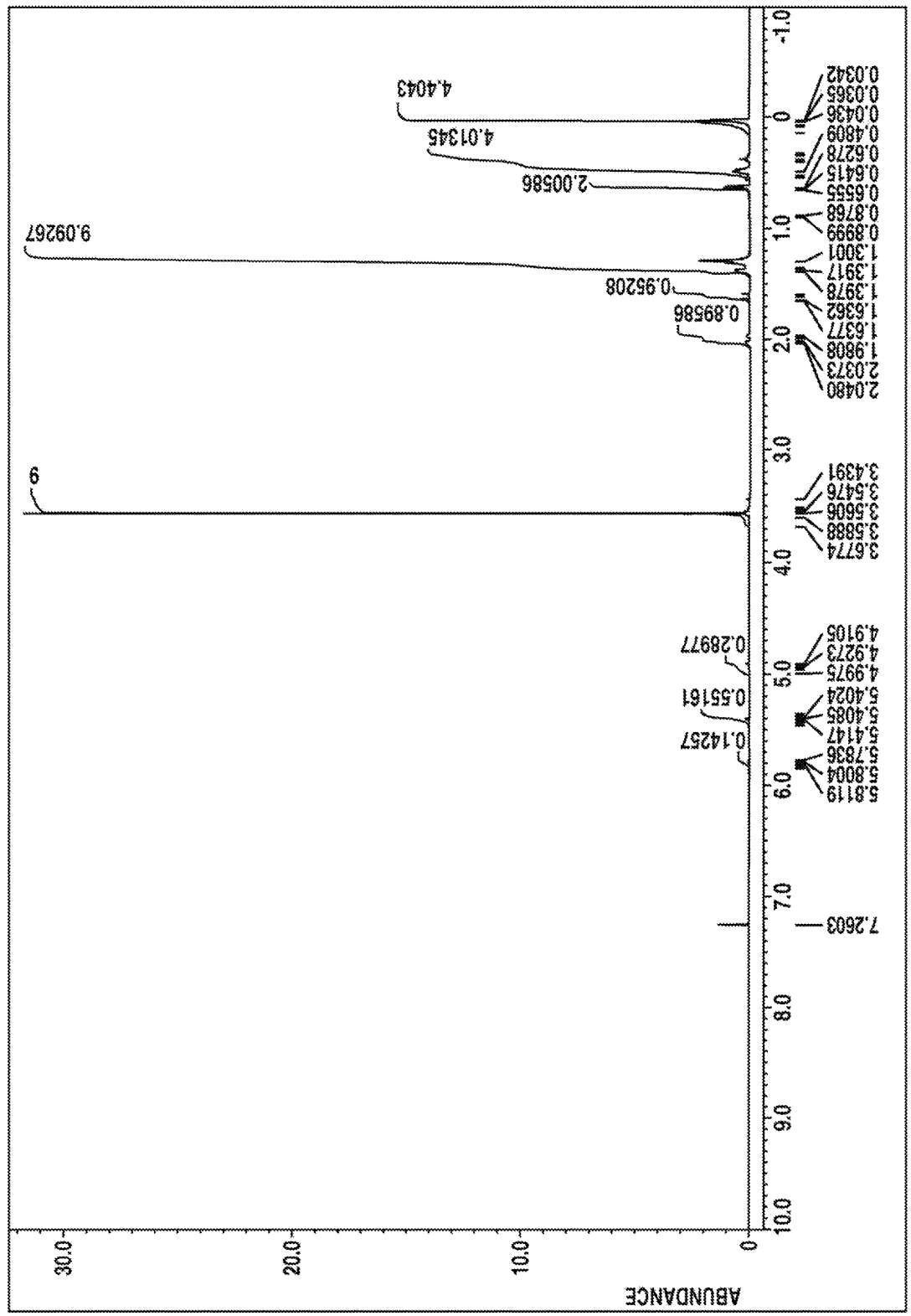
FIG. 9 is a $^1$H-NMR spectrum of the silazane compound obtained in Example 1-8.
Figure 10:
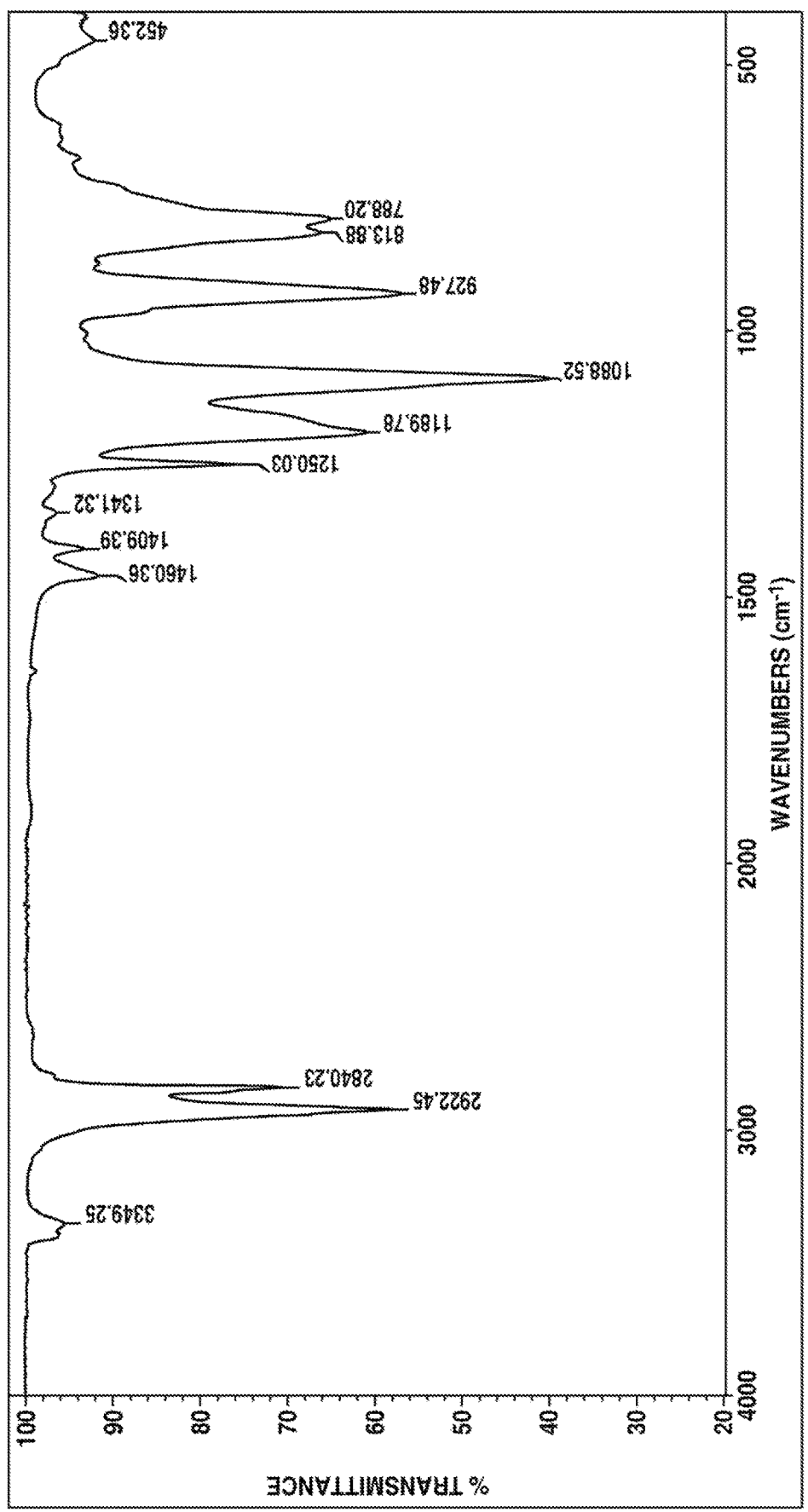
FIG. 10 is an IR spectrum of the silazane compound obtained in Example 1-8.

From the results of $^1$H-NMR (deuterated chloroform solvent) and IR analysis of the reaction liquid, production of Silazane compound 8 was confirmed. The $^1$H-NMR spectrum is shown in FIG. 9, and the IR spectrum is shown in FIG. 10. GPC analysis was performed, and the number average molecular weight was found to be 1,355.

Example 1-9

Synthesis of Silazane Compound 9 by Reaction of Polysilazane Compound with Trimethoxysilane

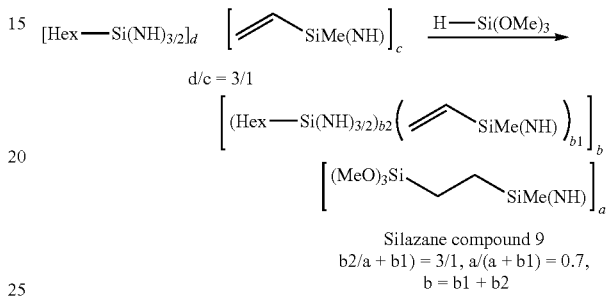

Silazane compound 9
b2/a + b1) = 3/1, a/(a + b1) = 0.7,
b = b1 + b2

To a flask equipped with a stirrer, a reflux condenser, a dropping funnel, and a thermometer, 20 g of a solution of 50% IP solvent 1620 (manufactured by Idemitsu Kosan Co., Ltd.) containing the organic polysilazane compound shown in the Figure above (number average molecular weight: 2,035) and 0.0134 g (0.00000206 mol in terms of platinum) of a toluene solution of platinum-1,3-divinyl-1,1,3,3-tetramethyldisiloxane complex were added and heated to 80° C. While maintaining the temperature at 85° C. or lower, 1.7 g (0.014 mol) of trimethoxysilane was added from the dropping funnel over 30 minutes, and further stirred at the same temperature for 2 hours. The obtained reaction liquid was heated at 120° C./4 kPa for 2 hours to remove low boiling components. The content of the non-volatile matter of this solution was measured with an infrared moisture meter (FD-720, manufactured by Kett Electric Laboratory) under conditions of 105° C./3 hours, and found to be 68.2%. To this solution, 4.7 g of IP solvent 1620 was added to adjust the content of the non-volatile matter to 50%.

Figure 11:
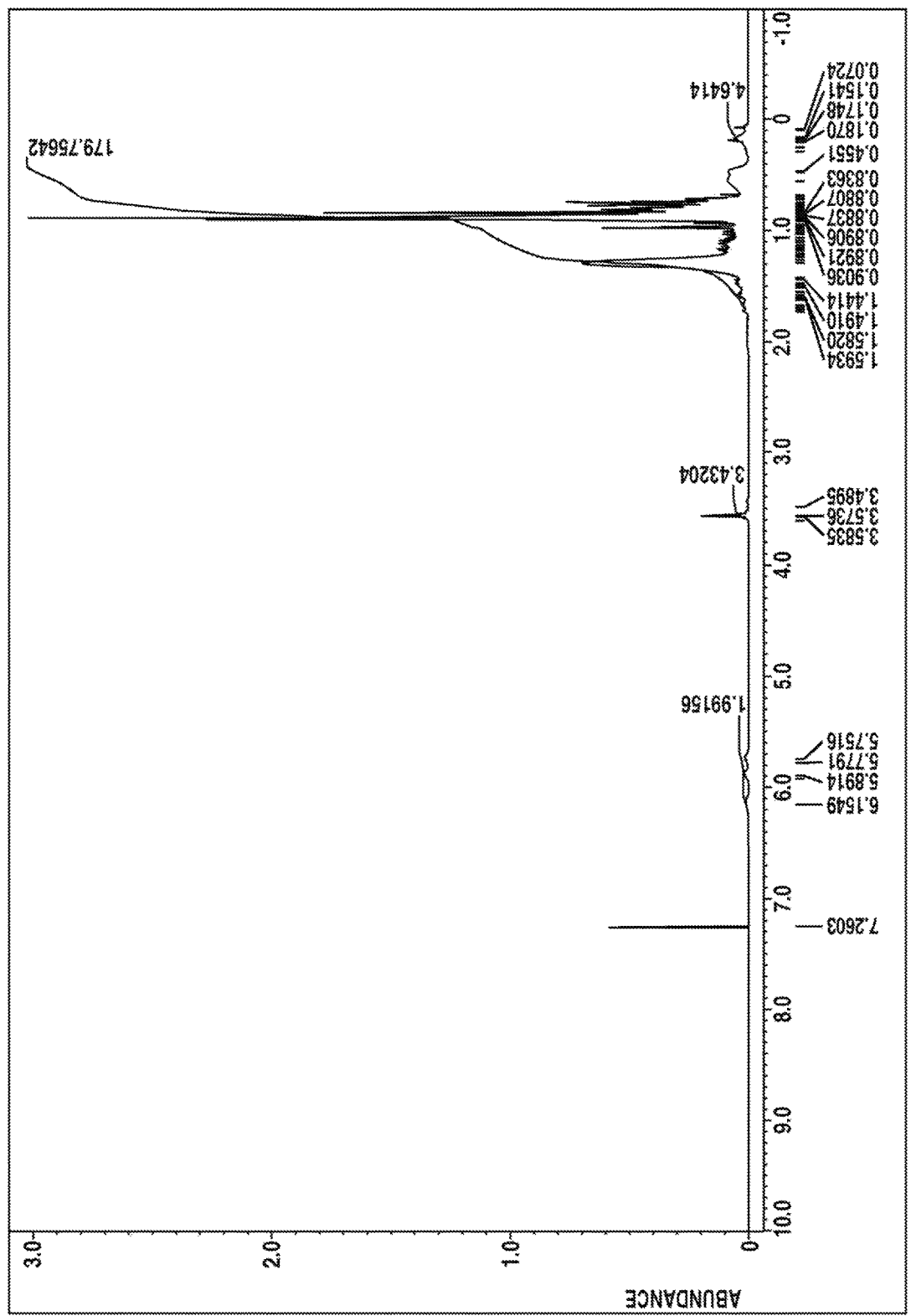
FIG. 11 is a $^1$H-NMR spectrum of the silazane compound obtained in Example 1-9.
Figure 12:
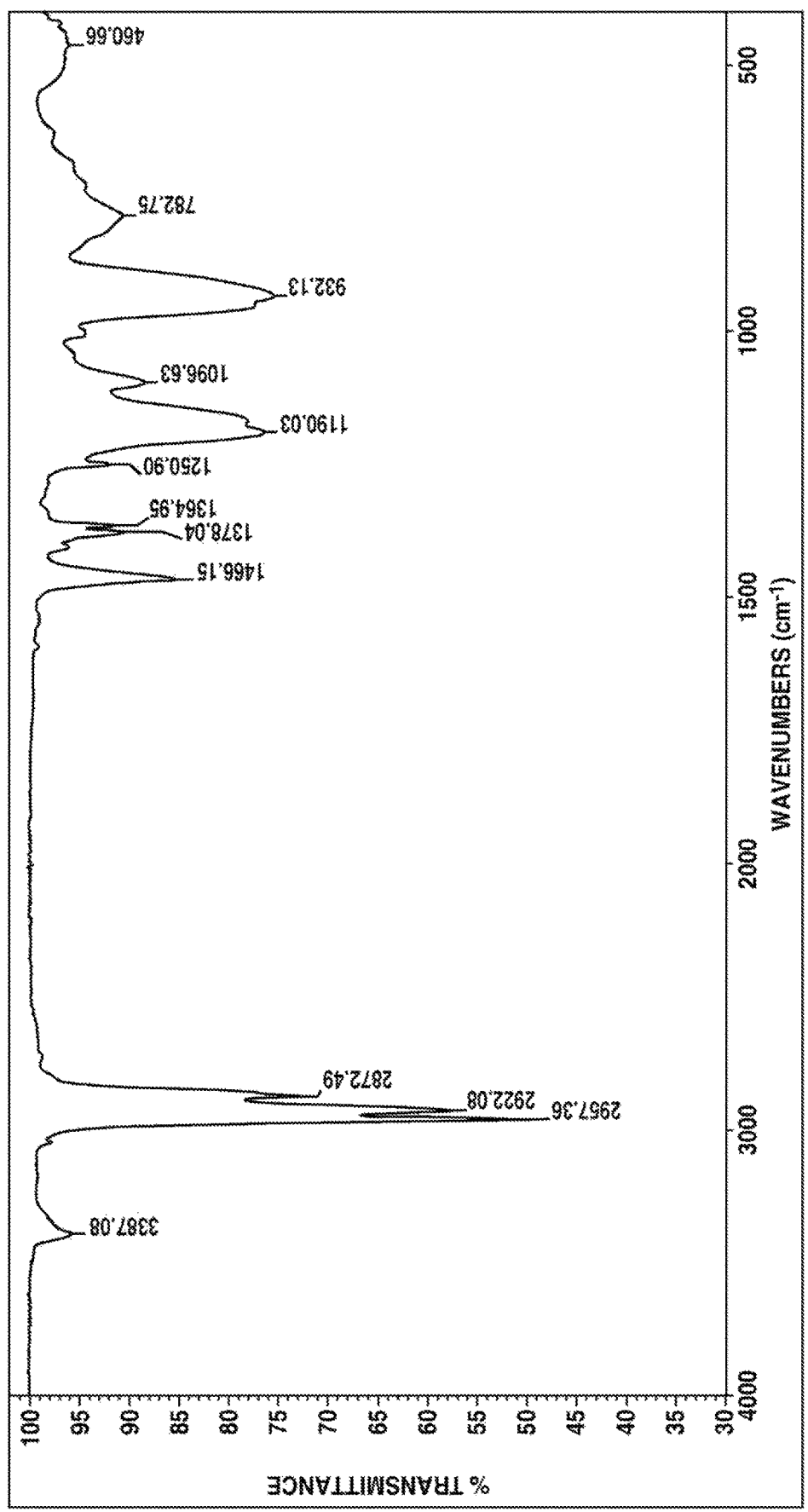
FIG. 12 is an IR spectrum of the silazane compound obtained in Example 1-9.

From the results of $^1$H-NMR (deuterated chloroform solvent) and IR analysis of the reaction liquid, production of Silazane compound 9 was confirmed. The $^1$H-NMR spectrum is shown in FIG. 11, and the IR spectrum is shown in FIG. 12. GPC analysis was performed under the same conditions as in Example 1-7, and the number average molecular weight was found to be 2,635.

Examples 2-1 to 2-10 and Comparative Examples 2-1 and 2-2

The obtained silazane compounds 1, and 5 to 9 and the compounds in Comparative Examples were mixed at the ratios shown in Table 1 below with being careful to prevent moisture from entering to prepare compositions.

The prepared compositions were applied on soda glass (15×15 cm) with a bar coater to a wet thickness of 30 μm, and then cured at 25° C. and 50% relative humidity. The tacky dry time (tack-free time) at that time was measured and evaluated as follows. The results are shown in Table 1.

[Evaluation Criteria]
A: The composition reaches tack-free in less than 30 minutes
B: The composition reaches tack-free in 30 to 60 minutes
C: The composition reaches tack-free in more than 60 minutes The soda glass which reached tack-free was further left at room temperature for 1 week. The coating of the obtained specimen was rubbed with a cotton cloth (cotton ciegal, manufactured by Chiyoda kagaku Co., Ltd.) dampened with ethanol, and the change in appearance was visually checked and judged as follows. The results are shown in Table 1.

[Evaluation Criteria]
A: The wiped part has no change
B: The wiped part has traces
C: The wiped part is peeled off

TABLE 1

| Component (parts by weight) | | 2-1 | 2-2 | 2-3 | 2-4 | 2-5 | 2-6 | 2-7 | 2-8 | 2-9 | 2-10 | Comparative Example 2-1 | 2-2 |
|---|---|---|---|---|---|---|---|---|---|---|---|---|---|
| Main component | Silazane 1 | 50 | | | | | | | | | | | |
| | Silazane 5 | | 50 | 50 | | | | | | | | | |
| | Silazane 6 | | | | 50 | 50 | | | | | | | |
| | Silazane 7 | | | | | | 50 | 50 | | | | | |
| | Silazane 8 | | | | | | | | 50 | 50 | | | |
| | Silazane 9 | | | | | | | | | | 50 | | |
| | KR-500 | | | | | | | | | | | 50 | |
| | KR-311 | | | | | | | | | | | | 40 |
| Solvent | IP solvent 1620 | 50 | 50 | 50 | 50 | 50 | 50 | 50 | 50 | 50 | 50 | 50 | |
| | Xylene | | | | | | | | | | | | 60 |
| Curing catalyst | TTIP | 1.25 | 1.25 | 0.625 | 1.25 | 0.25 | 1.25 | 0.625 | 1.25 | 0.625 | 1.25 | 1.25 | 1.25 |
| | DX-9740 | | | 0.625 | | 1 | | 0.625 | | 0.625 | | | |
| Evaluation | Tack-free time (minutes) | A | A | A | A | A | A | A | A | A | B | A | A |
| | Alcohol resistance | A | A | A | A | A | B | B | B | B | B | C | C |

The components described in Table are shown below.
KR-500: alkoxysilicone oligomer free of silazane structures (manufactured by Shin-Etsu Chemical Co., Ltd.)
KR-311: silicone resin free of silazane structures (manufactured by Shin-Etsu Chemical Co., Ltd.)
IP solvent1620: isoparaffin solvent (manufactured by Idemitsu Kosan Co., Ltd.)
TTIP: tetraisopropyl orthotitanate (manufactured by KANTO CHEMICAL CO., INC.)
DX-9740: aluminum curing catalyst (manufactured by Shin-Etsu Chemical Co., Ltd.)

The compositions having an alkoxysilyl group-containing organic silazane compound as a main component in Examples reach tack-free within 60 minutes at room temperature, and thus have excellent curing properties because the compositions. The coating had no significant deterioration in appearance even if the coating was wiped with a cotton ciegal dampened with alcohol, and thus the compositions were proved to be alcohol resistance.

Meanwhile, though the silicone oligomers and silicone resins free of silazane structures in Comparative Examples quickly form a cured coating at room temperature in the presence of a catalyst, the coating was peeled off if the coating was wiped with a cotton ciegal dampened with alcohol. Thus, the compositions were proved to be not alcohol resistance.

Japanese Patent Application No. 2019-078682 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An alkoxysilyl group-containing organic silazane compound having an average composition represented by general formula (1) below:

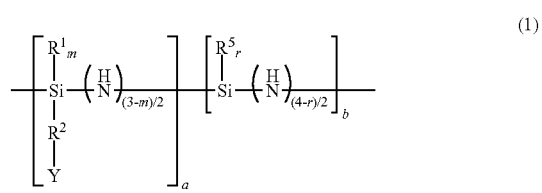

wherein $R^1$ is each independently a monovalent hydrocarbon group having 1 to 10 carbon atoms, $R^2$ is each independently a substituted or unsubstituted divalent hydrocarbon group having 2 to 20 carbon atoms containing a heteroatom of O, S, or Si, Y is a group represented by formula (6) or (7) below:

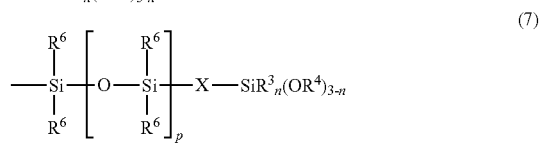

wherein $R^3$ and $R^4$ are each independently a monovalent hydrocarbon group having 1 to 10 carbon atoms, $R^6$ is each independently a substituted or unsubstituted monovalent hydrocarbon group having 1 to 10 carbon atoms, X is an oxygen atom, or a substituted or unsubstituted divalent hydrocarbon group having 1 to 18 carbon atoms, p is an integer of 0 to 9, and n is 0, 1, or 2, $R^5$ is each independently a substituted or unsubstituted monovalent hydrocarbon group having 1 to 50 carbon atoms optionally containing a heteroatom of O or S, m is each independently 0 or 1, r is each independently 0, 1, or 2, and a and b are numbers which satisfy $0<a\leq 1$, $0\leq b<1$, and $a+b=1$.

2. An alkoxysilyl group-containing organic silazane compound according to claim 1 which has any one of the following formula:

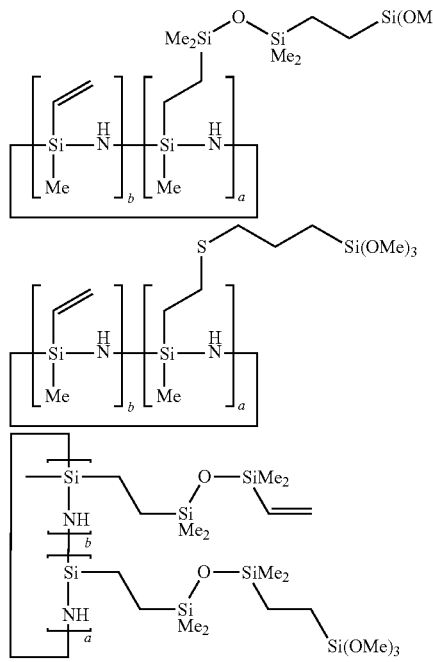

wherein Me is methyl, a and b are numbers which satisfy $0<a\leq 1$, $0\leq b<1$, and $a+b=1$.

3. A method for producing the alkoxysilyl group-containing organic silazane compound according to claim 1, comprising:
reacting, in the presence of a platinum catalyst, an unsaturated bond-containing organic silazane compound represented by general formula (2) below:

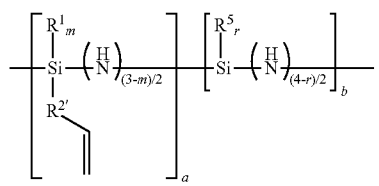

(2)

wherein $R^{2\prime}$ is each independently a single bond or a substituted or unsubstituted divalent hydrocarbon group having 1 to 18 carbon atoms containing a heteroatom of O, S, or Si, and R', $R^5$, a, b, m, and r have the same meaning as above,
with a hydrogensilane compound represented by general formula (3) or (4) below:

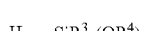

(3)

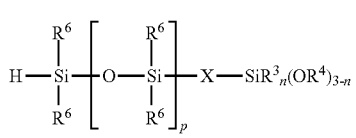

(4)

wherein $R^3$, $R^4$, $R^6$, X, n, and p have the same meaning as above.

4. A method for producing the alkoxysilyl group-containing organic silazane compound according to claim 1, comprising:
reacting, in the presence of a radical generator, an unsaturated bond-containing organic silazane compound represented by general formula (2) below:

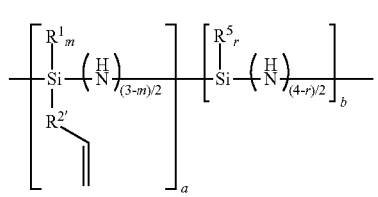

(2)

wherein $R^{2\prime}$ is each independently a single bond or a substituted or unsubstituted divalent hydrocarbon group having 1 to 18 carbon atoms containing a heteroatom of O, S, or Si, and R', $R^5$, a, b, m, and r have the same meaning as above, with a mercapto group-containing silane compound represented by general formula (5) below:

HS—$R^8$—$SiR^3{}_n(OR^4)_{3-n}$ (5)

wherein $R^8$ is a divalent hydrocarbon group having 1 to 18 carbon atoms, and $R^3$, $R^4$, and n have the same meaning as above.

5. A composition comprising:
the alkoxysilyl group-containing organic silazane compound according to claim 1; and
at least one metal compound selected from the group consisting of a titanium compound, an aluminum compound, a zinc compound, and a tin compound.

6. The composition according to claim 5, further comprising a solvent.

7. A cured product of the composition according to claim 5.

8. A cured product of the composition according to claim 6.

* * * * *